(12) United States Patent
Korgav et al.

(10) Patent No.: US 8,346,662 B2
(45) Date of Patent: Jan. 1, 2013

(54) DESKTOP ALERT WITH INTERACTIVE BONA FIDE DISPUTE INITIATION THROUGH CHAT SESSION FACILITATED BY DESKTOP APPLICATION

(75) Inventors: Ayse Korgav, San Mateo, CA (US); Raymond P. P. Chan, Mountain View, CA (US); Jie Feng, Foster City, CA (US); Michele Ann Colgan, Alameda, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 129 days.

(21) Appl. No.: 12/122,573

(22) Filed: May 16, 2008

(65) Prior Publication Data

US 2009/0287604 A1 Nov. 19, 2009

(51) Int. Cl.
*G06Q 40/00* (2006.01)
(52) U.S. Cl. ............... 705/40; 705/39; 705/42; 715/706
(58) Field of Classification Search ............... 705/15–45, 705/1, 14; 715/706
See application file for complete search history.

(56) References Cited

U.S. PATENT DOCUMENTS

| | | |
|---|---|---|
| 5,448,471 A | 9/1995 | Deaton et al. |
| 5,483,444 A | 1/1996 | Heintzeman et al. |
| 5,513,250 A | 4/1996 | McAllister |
| 5,530,438 A | 6/1996 | Bickham et al. |
| 5,592,560 A | 1/1997 | Deaton et al. |
| 5,604,921 A | 2/1997 | Alanara |
| 5,615,110 A | 3/1997 | Wong |
| 5,642,485 A | 6/1997 | Deaton et al. |
| 5,708,422 A | 1/1998 | Blonder et al. |
| 5,774,882 A | 6/1998 | Keen et al. |
| 5,852,775 A | 12/1998 | Hidary |
| 5,878,337 A | 3/1999 | Joao et al. |
| 5,903,830 A | 5/1999 | Joao et al. |

(Continued)

FOREIGN PATENT DOCUMENTS

AU 2005279689 3/2006

(Continued)

OTHER PUBLICATIONS

"New Tools Are Born to Orbit Around EBay", Stephen Mihm. New York Times. (Late Edition (East Coast)). New York, N.Y.: Jun. 13, 2001, p. H.10. ProQuest retrieve.*

(Continued)

*Primary Examiner* — Hai Tran
(74) *Attorney, Agent, or Firm* — Kilpatrick Townsend & Stockton LLP

(57) ABSTRACT

A consumer installs a desktop application on a computer which renders a user interface on the computer's desktop. Upon installation, the desktop application is registered to receive offers and alerts. Each alert includes data for a transaction on an account conducted with a merchant where the account was issued by an issuer to an account holder to conduct transactions on the account with merchants. A received alert is rendered on the desktop. If the consumer, upon review of the rendered alert, deems the corresponding transaction to be fraudulent, the consumer can operate the user interface to activate a live chat with a web service, and use the live chat to send information sufficient to initiate a bona fide dispute of the transaction. The offers are rendered on the user interface as advertisement and are selectable to initiate a transaction on the account.

25 Claims, 25 Drawing Sheets

U.S. PATENT DOCUMENTS

| | | |
|---|---|---|
| 6,012,144 A | 1/2000 | Pickett |
| 6,049,778 A | 4/2000 | Walker et al. |
| 6,055,570 A | 4/2000 | Nielsen |
| 6,064,990 A | 5/2000 | Goldsmith |
| 6,067,529 A | 5/2000 | Ray |
| 6,185,200 B1 | 2/2001 | Prasad |
| 6,185,290 B1 | 2/2001 | Shaffer et al. |
| 6,185,541 B1 | 2/2001 | Scroggie et al. |
| 6,292,786 B1 | 9/2001 | Deaton et al. |
| 6,311,169 B2 | 10/2001 | Duhon |
| 6,330,550 B1 | 12/2001 | Brisebois et al. |
| 6,353,398 B1 | 3/2002 | Amin |
| 6,381,324 B1 | 4/2002 | Shaffer et al. |
| 6,418,436 B1 | 7/2002 | Degen et al. |
| 6,424,951 B1 | 7/2002 | Shurling et al. |
| 6,442,532 B1 | 8/2002 | Kawan |
| 6,484,148 B1 | 11/2002 | Boyd |
| 6,505,046 B1 | 1/2003 | Baker |
| 6,529,725 B1 | 3/2003 | Joao et al. |
| 6,535,855 B1 | 3/2003 | Cahill et al. |
| 6,553,100 B1 | 4/2003 | Chen et al. |
| 6,608,556 B2 | 8/2003 | De Moerloose et al. |
| 6,612,488 B2 | 9/2003 | Suzuki |
| 6,629,081 B1 * | 9/2003 | Cornelius et al. ............... 705/30 |
| 6,636,587 B1 | 10/2003 | Nagai et al. |
| 6,647,269 B2 | 11/2003 | Hendrey et al. |
| 6,684,195 B1 | 1/2004 | Deaton et al. |
| 6,741,188 B1 | 5/2004 | Miller et al. |
| 6,775,539 B2 | 8/2004 | Deshpande |
| 6,842,774 B1 | 1/2005 | Piccioni |
| 6,859,451 B1 | 2/2005 | Pasternack et al. |
| 6,873,972 B1 | 3/2005 | Marcial et al. |
| 6,879,838 B2 | 4/2005 | Rankin |
| 6,891,911 B2 | 5/2005 | Rostoker et al. |
| 6,912,398 B1 | 6/2005 | Domnitz |
| 6,913,194 B2 | 7/2005 | Suzuki |
| 6,970,850 B1 | 11/2005 | Freeny, Jr. |
| 6,993,326 B2 | 1/2006 | Link, II et al. |
| 7,003,497 B2 | 2/2006 | Maes |
| 7,024,211 B1 | 4/2006 | Martin |
| 7,024,396 B2 | 4/2006 | Woodward |
| 7,027,801 B1 | 4/2006 | Hall et al. |
| 7,028,052 B2 | 4/2006 | Chapman et al. |
| 7,092,724 B2 | 8/2006 | Fellenstein et al. |
| 7,096,003 B2 | 8/2006 | Joao et al. |
| 7,100,049 B2 | 8/2006 | Gasparini et al. |
| 7,167,830 B2 | 1/2007 | Sravanapudi et al. |
| 7,203,300 B2 | 4/2007 | Shaffer et al. |
| 7,310,534 B2 | 12/2007 | Northcutt |
| 7,337,119 B1 | 2/2008 | Geschwender et al. |
| 7,343,149 B2 | 3/2008 | Benco |
| 7,355,990 B2 | 4/2008 | Smith |
| 7,356,506 B2 | 4/2008 | Watson |
| 7,357,310 B2 | 4/2008 | Calabrese et al. |
| 7,376,431 B2 | 5/2008 | Niedermeyer |
| 7,418,086 B2 | 8/2008 | Sravanapudi et al. |
| 2001/0011245 A1 | 8/2001 | Duhon |
| 2001/0029485 A1 | 10/2001 | Brody et al. |
| 2001/0037205 A1 * | 11/2001 | Joao ................................. 705/1 |
| 2001/0044764 A1 * | 11/2001 | Arnold ........................... 705/35 |
| 2002/0077964 A1 | 6/2002 | Brody et al. |
| 2002/0087460 A1 | 7/2002 | Hornung |
| 2002/0116322 A1 | 8/2002 | Schnall |
| 2002/0128944 A1 * | 9/2002 | Crabtree et al. ................ 705/37 |
| 2002/0133462 A1 | 9/2002 | Shteyn |
| 2003/0061163 A1 | 3/2003 | Durfield |
| 2003/0105707 A1 | 6/2003 | Audebert |
| 2003/0182191 A1 | 9/2003 | Oliver |
| 2004/0039683 A1 | 2/2004 | McGeorge |
| 2004/0064401 A1 | 4/2004 | Palaghita |
| 2004/0078340 A1 | 4/2004 | Evans |
| 2004/0103049 A1 | 5/2004 | Kerr |
| 2004/0199470 A1 | 10/2004 | Ferry, Jr. |
| 2005/0154665 A1 | 7/2005 | Kerr |
| 2005/0170814 A1 | 8/2005 | Joao et al. |
| 2005/0192893 A1 * | 9/2005 | Keeling et al. .................. 705/39 |
| 2005/0199775 A1 | 9/2005 | Kaminski et al. |
| 2006/0059110 A1 | 3/2006 | Madhok |
| 2006/0080111 A1 * | 4/2006 | Homeier-Beals ................ 705/1 |
| 2006/0089905 A1 | 4/2006 | Song et al. |
| 2006/0200396 A1 | 9/2006 | Satterfield et al. |
| 2006/0202025 A1 | 9/2006 | Calabrese et al. |
| 2006/0277142 A1 | 12/2006 | McGeorge |
| 2006/0281439 A1 | 12/2006 | Benco et al. |
| 2007/0006286 A1 | 1/2007 | Singhal |
| 2007/0113181 A1 * | 5/2007 | Blattner et al. ............... 715/706 |
| 2008/0004950 A1 | 1/2008 | Huang et al. |
| 2008/0147484 A1 | 6/2008 | Davis |
| 2008/0156869 A1 | 7/2008 | Carr et al. |
| 2008/0182590 A1 | 7/2008 | Ruckart et al. |
| 2008/0200144 A1 | 8/2008 | Ginsberg |
| 2008/0288385 A1 | 11/2008 | Geschwender et al. |
| 2009/0106846 A1 | 4/2009 | Dupray et al. |

FOREIGN PATENT DOCUMENTS

| | | |
|---|---|---|
| JP | 2006-244082 | 9/2006 |
| KR | 10-2006-0013911 | 2/2006 |
| KR | 10-2007-0072819 | 7/2007 |
| KR | 10-2008-0037743 | 5/2008 |

OTHER PUBLICATIONS

Wolf, Jim; "New Web Service Warns of Identity Theft;" www.greenspun.com/bboard/q-and-a-fetch-msg.tcl?msg_id=003yBJ; Oct. 23, 2000; printed May 4, 2011; 2 pages.

* cited by examiner

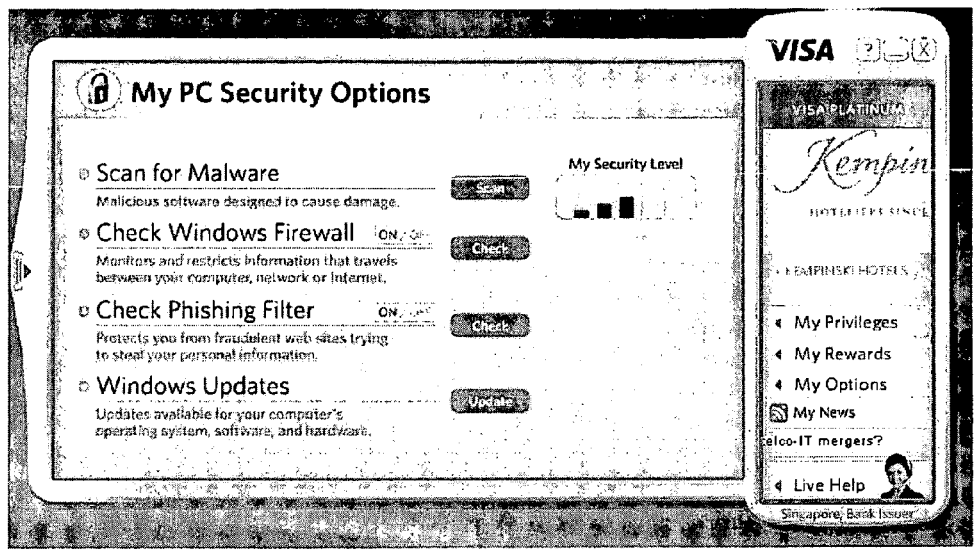
Figure 21
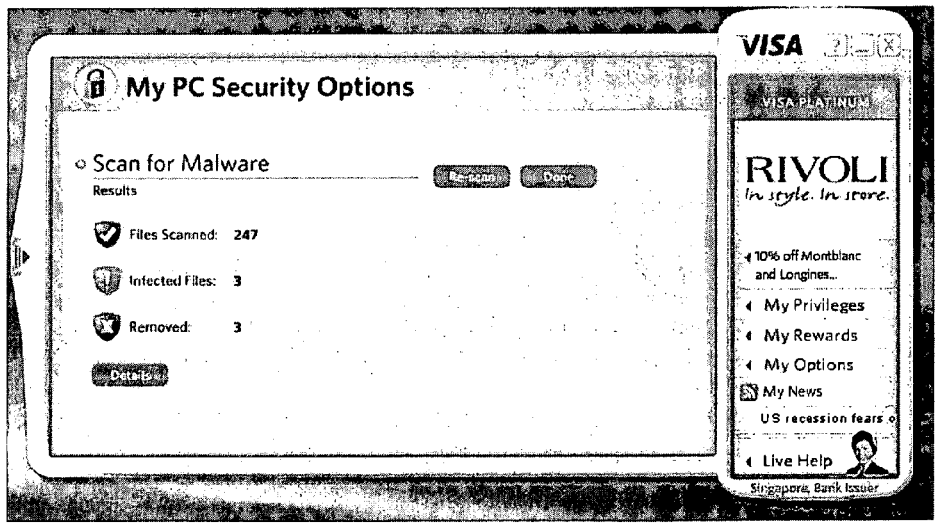

US 8,346,662 B2

DESKTOP ALERT WITH INTERACTIVE BONA FIDE DISPUTE INITIATION THROUGH CHAT SESSION FACILITATED BY DESKTOP APPLICATION

FIELD

Implementations generally relate to a cashless transaction with a merchant by consumer upon an account issued by an issuer, more particularly relate to a fraudulent such cashless transaction, and most particularly relate to a bona fide dispute of a fraudulent such cashless transaction.

BACKGROUND

Advertisements delivered by a postal service such as the US Postal Service, also known as direct mail or 'junk mail', is considered by an advertiser to be successful if the response rate by its recipients is around one percent (1%). It would be an advantage to deliver an advertisement to recipients particularly identified to be likely to respond to the advertisement to thereby increase the response rate of recipients to the advertisement.

Debit and credit card transaction handlers, as well as issuers of such cards, would like to build loyalty in the account holders in using their cards as well as awareness of the brand of the transaction handlers and issuers. One way of building such loyalty and brand awareness is to send an advertisement of offer to the account holder that can only be accepted by use of the account holder's branded card. In would be an advantage to increase the response rate to such advertisements while also building account holder loyalty and brand awareness.

Cashless consumer transactions with merchants are those that are typically payable on credit, debit and prepaid cards (Plastic Cards). The issuers of Plastic Cards (i.e., Wells Fargo, Bank of America, etc.) and those entities handling the processing cashless transactions on such Plastic Cards (e.g.; American Express, MasterCard, Diner's Club, etc.) have Internet websites that offer card holders premiums for use for cards to conduct transactions to purchase a good or service. This Website service transaction, which lacks a middle man common to a brick and mortar purchase, is inherently low in the overhead to conduct the transaction. These issuers and transaction handlers earn revenue when a card holder uses their card to obtain the premium offers in this kind of purchase at these Websites. It would be an advantage to increase the volume of consumer purchases generated by the premium offer websites, thereby increasing revenues.

Fraud in cashless transactions conducted with Plastic Cards is a problem. This kind of fraudulent transaction might not be identified until long after the transaction has been conducted. By way of example, a consumer may not recognize a transaction conducted on the consumer's account as being fraudulent until it appears on a printed monthly statement for that account. It would be an advantage to provide a way for a consumer to recognize a transaction conducted on the consumer's account as being fraudulent long before the transaction appears on the consumer's printed monthly statement of account.

SUMMARY

In one implementation, a consumer installs a desktop application on a computer. When executed, the desktop application renders a user interface on the desktop of the computer's desktop. Upon installation, the desktop application is registered to receive offers and alerts that are associated with an account issued by an issuer. As such, the consumer can be the account holder of the account. Each alert includes data for a transaction on the account, where the transaction was conducted with a merchant, and where the account was issued by an issuer to an account holder to conduct transactions on the account with merchants. When an alert is received by the computer, it is rendered as an alert on the computer's desktop. If the consumer, upon review of the rendered alert, deems that the corresponding transaction is fraudulent, the consumer can operate the user interface to activate a live chat with a web service. Upon activation, a live chat region of the user interface is rendered. The consumer can use the rendered live chat region to conduct a live chat with a web service to report the fraudulent transaction. The report can contain information sufficient to initiate a bona fide dispute of the transaction. Similarly, when an offer is received by the computer, the offer is rendered on the user interface as advertisement. The ad is selectable to initiate a function of the desktop application that will send a request to accept the offer.

BRIEF DESCRIPTION OF THE DRAWINGS

Implementations will become more apparent from the detailed description set forth below when taken in conjunction with the drawings, in which like elements bear like reference numerals.

FIGS. 14-23 are screen shots, both full and partial, as may occur on a display of a client interactively communicating with an offer and alerts management system;

DETAILED DESCRIPTION

Figure 1:
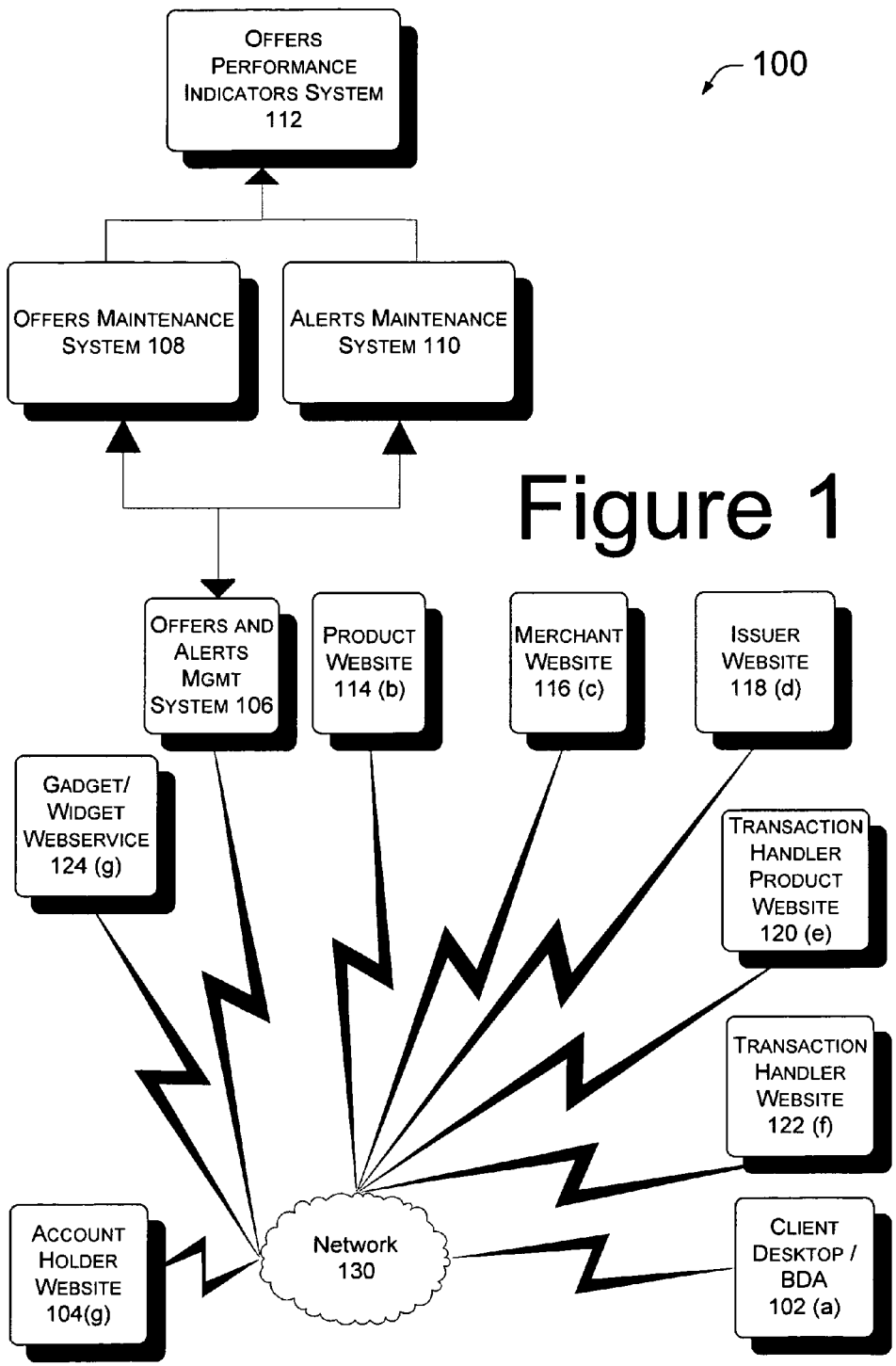
FIG. 1 is a block level diagram illustrating networked processes, systems, and services that provide an exemplary client-server environment.

An interactive user experience is offered to a consumer through an application that is installed on a desktop of a consumer's personal computer. This application can be branded to reflect a merchant who will make offers to the consumer. The branding can also reflect an issuer of an account that the issuer issued to the consumer, such as a debit or credit card account, where the issuer is a bank, a credit union, or other financial institution. Alternatively, the branding can reflect a transaction handler who will handle transactions on the account between the consumer and any one of numerous merchants, where the transaction hander is, for example, American Express, MasterCard, Discover, Diners Club, Visa, an agent of the foregoing, etc. If the interactive desktop application is branded, it is referred to herein after as a Branded Desktop Application (BDA).

The BDA will receive and render offers of particular interest to the consumer, who will be a cardholder or account holder of the account issued by the issuer. Offers are presented to the account holder as well as alerts, where each alert is about an issue that is relevant to the account of the cardholder. Thus, the BDA is a personal computer tool that delivers privileges and exclusive offers, tailored specifically to a cardholder's interest, where those deliveries are made directly to the cardholder's desktop personal computer. To begin, the personal computer user (i.e., the cardholder) downloads the BDA installation software to their PC. Next, the user sets up their user preferences for offers and alerts they'd like to receive on their desktop through their BDA. Thereafter, the BDA is immediately ready to receive timely and up-to-the-minute offers and alerts according to the configuration specified as preferences by the consumer.

After downloading and installing the BDA, an icon will appear in the system tray of the user's PC. The user can click on the icon to bring up a BDA 'toolbar' that will reside visually and be rendered upon the user's desktop. The BDA toolbar enables the user to view the highlights of their privileges as an account holder, as well as view details of those privileges, to set up the user's preferences for receiving offers and alerts, to receive various news streams via a Rich Site Summary (RSS), and to listen to music. The music will be either streamed to the desktop via a server or will be music that resides on the user's personal computer. Using the BDA toolbar, the user can also see an overview of all privileges that match their user preferences, as well as accessing various types of supporting resources available to the user as an account holder of their issuer.

A web service supporting the BDA will send the user an instant notification when a new privilege matching that user's preference becomes available. The user can view the privilege details, including redemption instructions for various offers associated with those privileges, with a single click of a mouse, and can also print out an offer that is rendered on the screen of the desktop of the PC with another click. In most cases, a telephone number or a web site link is provided for quick and convenient offer redemption of an offer that has been rendered on the user's desktop.

After the BDA is installed, the PC's system tray includes an icon. When a user boots their computer, the icon loads in the user's system tray. The user can click on this icon to bring up the BDA toolbar.

When an alert is delivered to the desktop of the user's PC, the user will review the alert to determine whether action should be taken. One such alert is a notice that a suspicious transaction upon the user's account is taking place or has taken place. If the user, upon reviewing the alert, decides that the suspicious transaction is fraudulent, the user can initiate a live chat session using the BDA tool. A live chat service will receive the user's information about the fraudulent transaction. The live chat service, or agent thereof, will then undertake a bona fide dispute process to resolve the transaction so that a monetary assessment will not appear on the statement of account for the user that is attributed to the allegedly fraudulent transaction.

The BDA, the BDA tool bar, and the offers and the alerts, as described above, can be implemented by various machines, methods, and combinations thereof. An exemplary environment for one such implementation is seen in FIG. 1. As such, FIG. 1 is a block level diagram illustrating networked processes, systems, and services that provide an exemplary client server environment 100 in which a client desktop/BDA 102(a) (where 'a' can be a number 1 though 'A') that operates on a personal computer. Client desktop/BDA 102(a) is in communication with network 130. By way of example, network 130 can be a collection of public networks, such as the Internet. Network 130 is in communication with one or more account holder websites 104(g) (where 'g' can be a number 1 though 'G'). Network 130 is also in communication with an offers and alerts management system 106. Offers and alerts management system 106 communicates through a network, which may be other than network 130, to maintain offers through an offer maintenance system 108 and to maintain alerts through an alerts maintenance system 110. In each case, the offers and alerts are intended for delivery to client desktop/BDA 102(a). The performance of the offers being maintained through offers maintenance system 108, relative to whether or not the offers being made are being viewed and transaction conducted therefore, can be measured and otherwise determined for metrics through an offer performance indicator system 112. Also in communication with network 130 is one or more product websites 114(b), one or more merchant websites 116(c), one or more issuer websites 118 (d), one or more transaction handler product websites 120(e), and one or more transaction handler websites 122(f). One or more gadget web services or widget web services 124 (g) can be in communication with client desktop/PDA 102(a) through network 130 for the provision of multimedia thereto.

In the reference numerals used in the Figures, unless otherwise indicated, the appearance of a lower case letter in parenthesis is intended to mean that there are one or more. As such, '(b)' indicates the number one (1) or any other number up to the highest number 'B', such that there would be a potentially infinite number.

One or more product websites 114(b) can be a website dedicated to a specific product that is being offered in an offer delivered to the desktop of the cardholder's PC having installed thereon client desktop/PDA 102(a). Similarly, one or more merchant websites 116(c) can each be dedicated on one merchant who makes an offer for a product or a service to the cardholder associated with the PC upon which is installed client desktop/PDA 102(a). One or more issuer websites 118 (d) can each be dedicated to the issuer who has issued the account to the cardholder associated with the PC executing client desktop/PDA 102(a).

One or more transaction handler product websites 102(e) are each intended to be a website that is dedicated to a particular product being offered by a transaction handler. This transaction handler can be for instance, Diner's Club, American Express, MasterCard, a private issued revolving credit account transaction handler, Visa, etc. As such, these respective transaction handlers correspond respectively to one transaction handler website 122(f). Each such transaction handler issues different products, such as a gold card credit card, a silver card, a platinum card, an Infinite card, a corporate purchase card, a fleet petroleum card, a prepaid card, a debit card, a check card, etc. With each such product, the transaction handler (and/or the issuer) the account holder may be afforded certain privileges, opportunities, special treatment, awards, rewards, offers and distinctions. As such, there can be one or more different transaction handler product websites 120(e). Environment 100 can include a plurality of transaction handlers, such as MasterCard, American Express, Diner's Club, Visa, etc. As such, one or more transaction handler websites 122 can be in communication with a plurality of client desktops/BDAs 102 through network 120.

Figure 2:
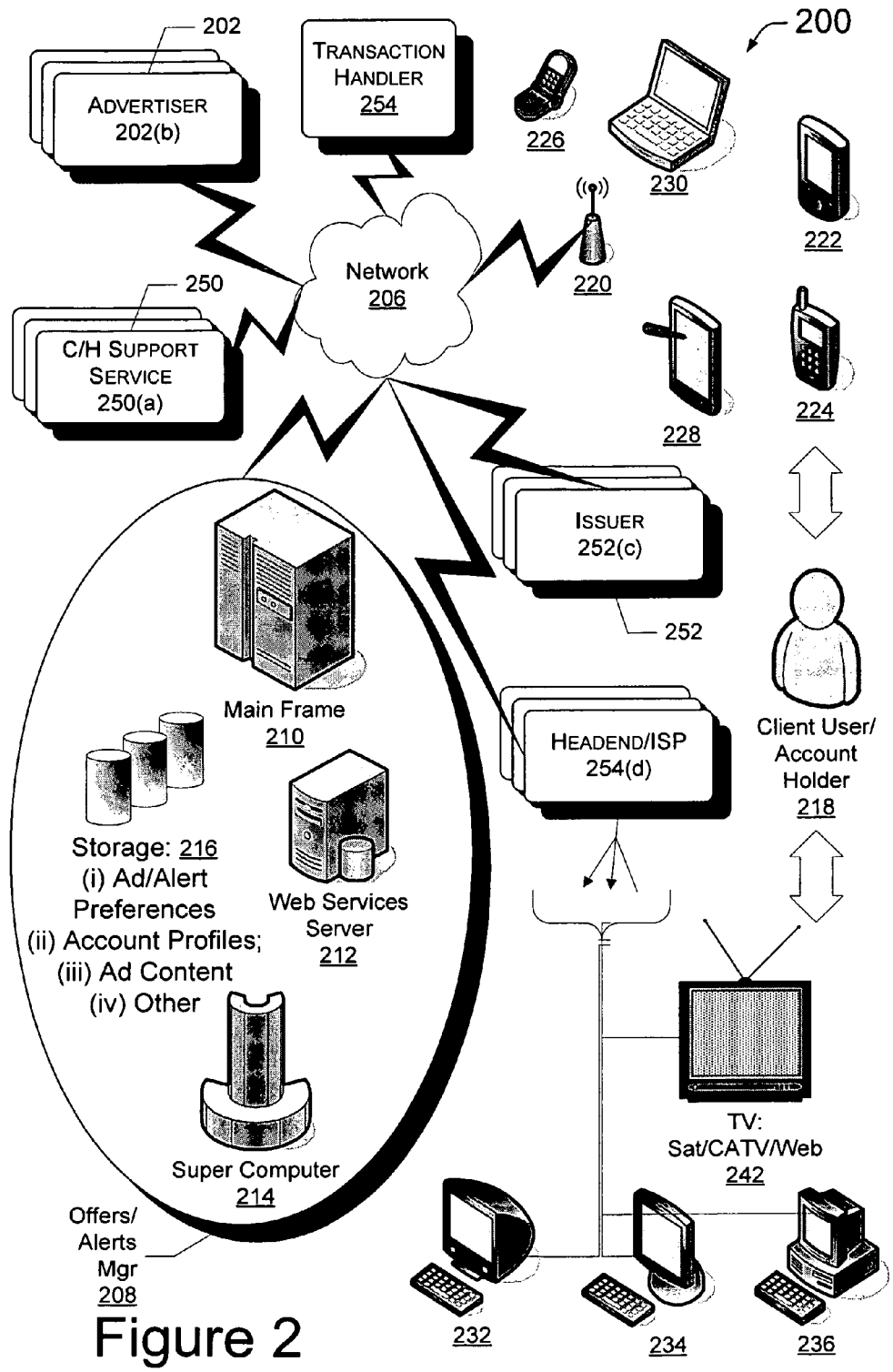
FIG. 2 is an exemplary environment for the delivery of alerts and offers from advertisers and other parties to clients.

The BDA, the BDA tool bar, and the offers and the alerts, as described above, can be implemented by various machines, methods, services, and combinations thereof. An exemplary environment for one such implementation is seen in FIG. 2. As such, FIG. 2 illustrates an exemplary environment 200 for the delivery by an Offers/Alerts Manager 208 of alerts and offers from each advertiser 202(b) to a client user/account holder 218. Each advertisement (ad) in each offer can be determined as per one or more of the implementations disclosed herein, where the offers are made according to preferences set by client user/account holder 218 as stored in a data storage unit 216, where the ad in the offer is also stored in data storage unit 216, and where the client user/account holder 218 may receive the offers and alerts using various methods, as illustrated by way of example, and not by way of limitation, in FIG. 2.

Network 206 is in communication with a transaction handler 254, for example, American Express, MasterCard, Discover, Diners Club, Visa, an agent of the foregoing, etc. Also in communication with network 206 are one or more issuers 252 and particularly the issuer 252(c) of the account of the account holder 218. One or more cardholder (account holder) support services 250(a) are in communication with network 206. Various services can be provided by cardholder support service 250(a) through network 206 to each client (222-242) being operated by client user/account holder 218. One such service is a live chat service as discussed below relative to the desktop 2200 in FIG. 22 and relative to reference numerals 2300a and 2300b in FIG. 23.

In one implementation, web services server 212 executes software capable of accepting hypertext transfer protocol (HTTP) requests (or requests in other communication protocols) from web browsers and returns HTTP or like responses with data including ads and alerts according to the account holder's 218 preferences as stored in data storage unit 216, where data storage unit 216 may be one or more networked server farms. In another implementation, web services server 212 is a computer running the aforementioned software. When, for example, an advertiser 202(b) requests an offer having a targeted advertisement to be directed to a specified class of account holders 218, web services server 212 accepts the request and, after processing by main frame 210 and super computer 214 determined that there is one or more offers that correspond to the preferences as stored in data storage unit 216, each such ad is delivered in an offer to each account holder 218 in the specified class of account holders 218.

Network 206 is in communication with a transaction handler 254, for example, American Express, MasterCard, Discover, Diners Club, Visa, an agent of the foregoing, etc. Also in communication with network 206 are one or more issuers 252 and particularly the issuer 252(c) of the account of the account holder 218. One or more cardholder (account holder) support services 250(a) are in communication with network 206. Various services can be provided by cardholder support service 250(a) through network 206 to each client (222-242) being operated by client user/account holder 218. One such service is a live chat service as discussed below relative to reference numeral 2200 in FIG. 22 and relative to reference numerals 2302-2310 in FIG. 23.

Having received offers and alerts for delivery to account holder 218 according to the preferences thereof as stored in data storage unit 216 of the offers/alerts manager 208, network 206 is used to communicate the offers and alerts, for example, over a wireless access point 220 to a wireless client having a BDA installed thereon (e.g., as an applet, moblet, etc.) according to the implementations disclosed herein. Examples of the wireless client include a portable digital assistant (PDA) 222, a smart phone 224, a cellular telephone 226, a tablet computer 228, a laptop computer 230 having wireless capability, or a combination thereof.

In another implementation, through one or more Internet Service Providers (ISP) 254(d), the ads and alerts, according to the stored preferences in data storage unit 216, are delivered to a wired client, such as an iMac® computer 232, an all-in-one desktop personal computer (PC) 234, a generic PC 236, or a combination thereof.

In additional implementations, the offers and alerts can be delivered from one or more head ends 254 of a cable or satellite television service provider, where the delivery is made to a television 242 through an integrated or separate set-top box (not shown). In these implementations, alerts and offers containing targeted ads are viewed on television 242 by the client user/account holder 218 via satellite television, cable television, internet television, video on demand television, pay-per-view television, or a combination thereof.

Figure 3:
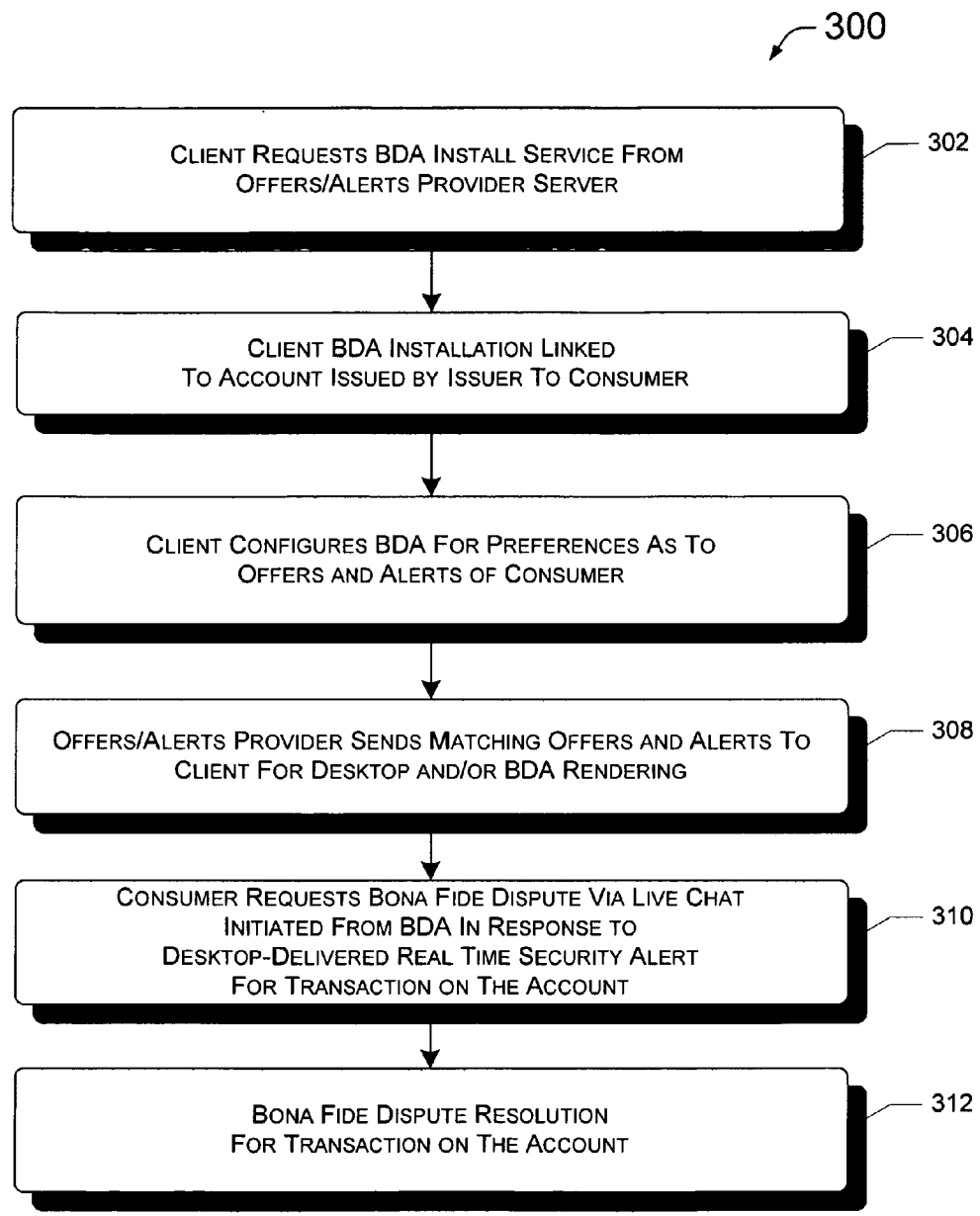
FIG. 3 is an exemplary method for the delivery by an offer and/or an alert to a client from a server.

FIG. 3 illustrates an exemplary method 300 for the delivery by an offer and/or an alert to a client from a server. One such alert that can be delivered in method 300 is a security alert that provides notice as to a transaction that is now being conducted, or that has been conducted, upon an account issued by an issuer, where the account has been issued to an account holder corresponding to the client that receives the security alert. Method 300 provides manipulative steps for responsively dealing with the security alert by the client so as to initiate a bona fide dispute for the transaction.

Method 300 begins in step 302 where a client requests the installation of a BDA via a download from a web service from an offer/alert provider server, such as offers/alerts manager 208 seen in FIG. 2. At step 304, a user operates the client's installation of the BDA so as to link the BDA to the account that was issued by an issuer to a consumer. Preferably the consumer, or agent thereof, is operating the client. At step 306, the client is used to configure the BDA for the preferences of the consumer as to those types and categories of advertisement-bearing offers and alerts that the consumer would like to receive on the desktop of their client. At step 308, the offers/alerts provider sends offers and alerts matching the consumer's preferences to the client for rendering on the desktop and/or BDA toolbar of the client.

At step 310, a security alert has been rendered on the desktop of the client. This alert can be a real time security alert that conveys information about a real-time or recent transaction that has been conducted upon the account of the consumer operating the client. The consumer responds to the security alert by requesting that a bona fide dispute of the transaction be initiated. This request is made by use of the BDA toolbar on the client via a live chat session that is initiated from the BDA toolbar. At step 312, a bona fide dispute resolution process is initiated to resolve the transaction on the account that was the subject of the security alert. By way of example of the foregoing, the live chat session initiated by the consumer would allow the consumer to engage in an interactive chat session with a web service. In the live chat session, the consumer would convey sufficient information to the web service to correctly and accurately allege that there had been a fraudulent transaction on the account that had taken place, where that transaction had been the subject of the security alert. The web service would then be able to institute a bona fide dispute on the transaction in compliance with the Fair Credit Billing Act (FCBA) and Electronic Fund Transfer Act (EFTA).

In an exemplary application of method 300, a consumer may receive a security alert on their desktop via the BDA installed on their client. If the consumer believes that an error or unauthorized charge has occurred or may occur on their billing for that account, the consumer will use the BDA toolbar to activate a live chat session with the transaction handler, with the issuer, or with an agent thereof, in order to provide a written request for an investigation of the particular transaction on the consumer's account. Thus, the BDA's alert and live chat capabilities provide a timely way for the initiation of the bona fide dispute so as to be in compliance with any regulatory timetables that may be established, such as by the EFTA and/or the FCBA, to thereby respond to a security alert in an expeditious fashion. The live chat service can then work with the transaction handler, with the issuer of the account, or with an agent thereof, who will ensure that the issuer will issue a charge-back if there has been a finding that the consumer's claim has merit and that the merchant cannot, or fails to, offer a defense.

In yet another implementation, the live chat can be used by the consumer to resolve a merchant or manufacturer dispute, where the consumer alleges a lack of consideration against a merchant or manufacturer in a transaction upon the consumer's account. Here, the live chat service can act in the role of a mediator between the consumer and another party to the transaction, though this mediation role is outside of the provisions of the EFTA and the FCBA. Thus, the live chat can be used when the consumer has received unsatisfactory goods or services, or for any kind of dispute involving a transaction between the account holder and a party to the transaction where the live chat service can help to find a resolution to the dispute.

Figure 4:
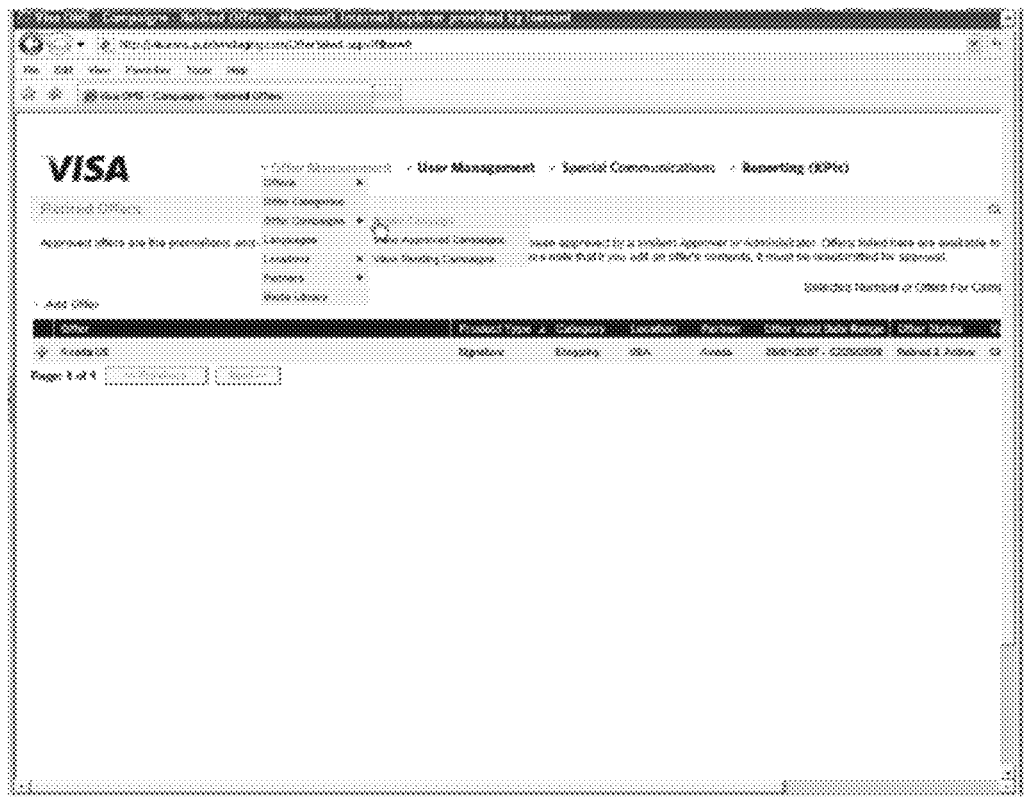
FIGS. 4-13 are screen shots, both full and partial, as may occur on a display of a computer executing an exemplary offer and alerts management system.

FIG. 4 refers to an exemplary offer management screen 400 through which offers for cardholders or account holders can be designed and implemented. The offer management screen 400 includes an icon that can be activated to create an offer, as well as offer categories and offer campaigns. The offer management screen 400 shows that the highlighted phrase "Create Campaign" has been activated so that an advertising campaign to make offers to account holders has been initiated. The offer management screen 400 includes a specific offer that has already been created titled "AVEDA US." The offer management screen 400 shows the type of product that the offer is for, in this case a 'Visa Signature' card. The offer management screen 400 shows the category of the offer which is for a particular discount or special offer for shopping for a good or service. The offer management screen 400 shows that the location for which the offer is active is to be for the United States. The offer management screen 400 shows that the partner is an entity that has been labeled "AVEDA." FIG. 4 shows retired offers.

The offer management screen 400 shows that the offer will be valid to be exercised by cardholders between Sep. 1, 2007 and Feb. 29, 2008. The offer management screen 400 shows that the offer is retired and also active under the offer status icon. The offer management screen 400 shows an icon that can be activated to show the performance indicators relating to different offers that have been made to the offer management system as referred to in FIG. 1 at reference numeral 112, where the offers being referred to are through the offer maintenance system 108 seen in FIG. 1. The Offers and Alerts Management System 106 can be the system through which key performance indicators are being measured for the Offers/Alerts Manager 208 seen in FIG. 2.

Figure 5:
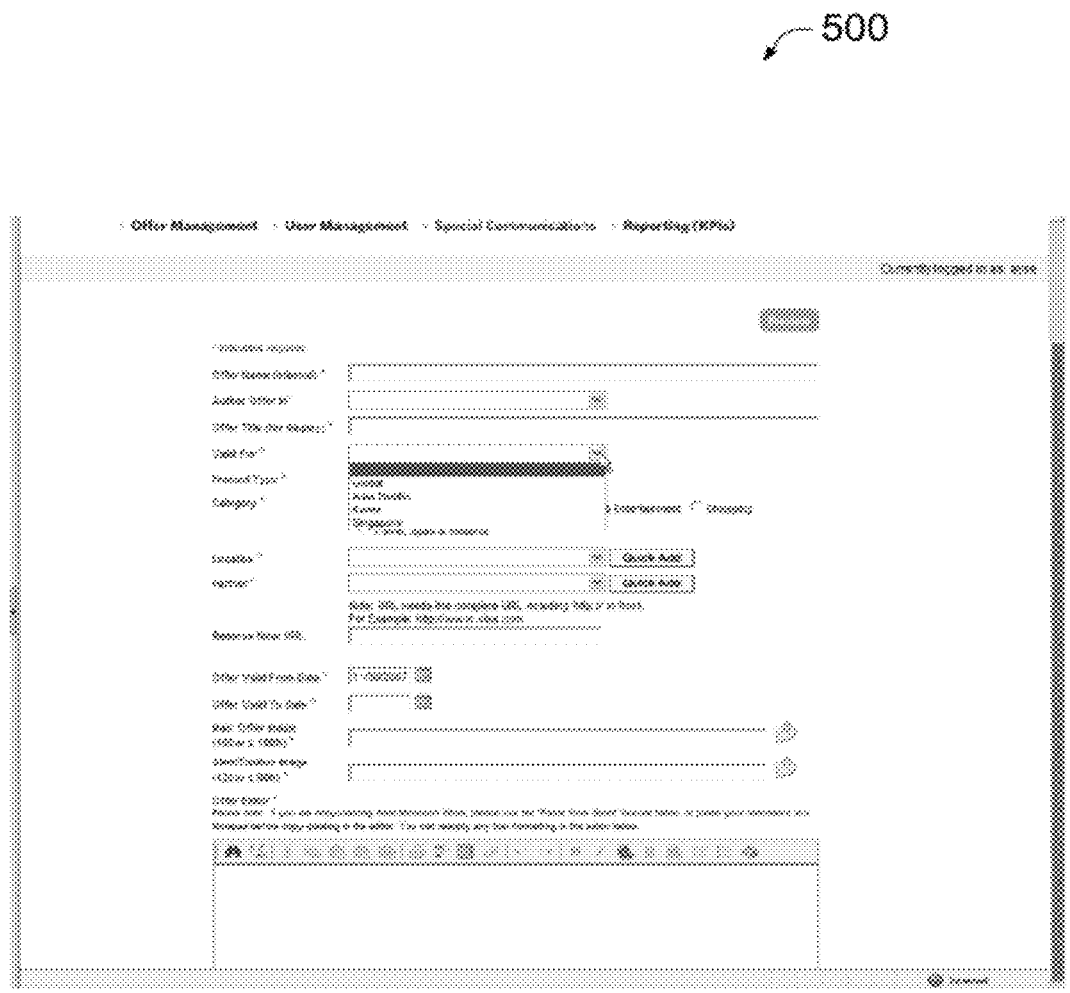

FIG. 5 shows a data input screen 500 in which an offer can be created. Various fields are open for input by data entry in order to create an offer to be offered to cardholders, who are otherwise accountholders, where the account has been issued by an issuer. A first field provides a field where the name of the offer can be specified. A second field is for input of the author of the offer and a third field is for input of the title of the offer. A pull down menu is for the selection of a geographic or political location where the offer is to be made valid. As seen in the pull down menu, the selections include Global, Asia/Pacific, Korea, and Singapore. A fourth field is for the location where the offer is to be valid. In this case, the location can be a particular city within the geographic or political location as selected from the pull down menu. A fifth field is for a particular partner that will be partnering with the offer. This partner can be, for instance, an issuer of a certain credit card in the name of a transaction handler, such as a Chase Manhattan Bank Visa Gold Card, a First Credit Union Platinum MasterCard, or any other such financial institution offering the product of a transaction handler. Alternatively, the partner can be a merchant who is a retail or wholesale merchant. The partner can also be a manufacturer who wholesales goods and services to merchants who in turn then offers those goods and services to cardholders for purchase. A sixth field is a place where a URL can be input that refers to further information about the offer, such as where an online purchase can be immediately made or reserved by going to a certain website where the offer can be immediately acted upon by a cardholder. An offer valid date is seen at a seventh field and the offer termination date is seen at an eight field, where the respective fields can be input through use of a calendar icon, and where a pop-up for a particular calendar can be seen and the date clicked on that is to be selected for the input field. As seen in the data input screen 500, input of images can to be offered in conjunction with the textural offer being made. These images can be an ad targeted to the account holder who will be likely to make a purchase through the offer management system as disclosed in various implementations herein. The offer editor is a ninth field allowing a user to make text input about the offer for further reference.

Figure 6:
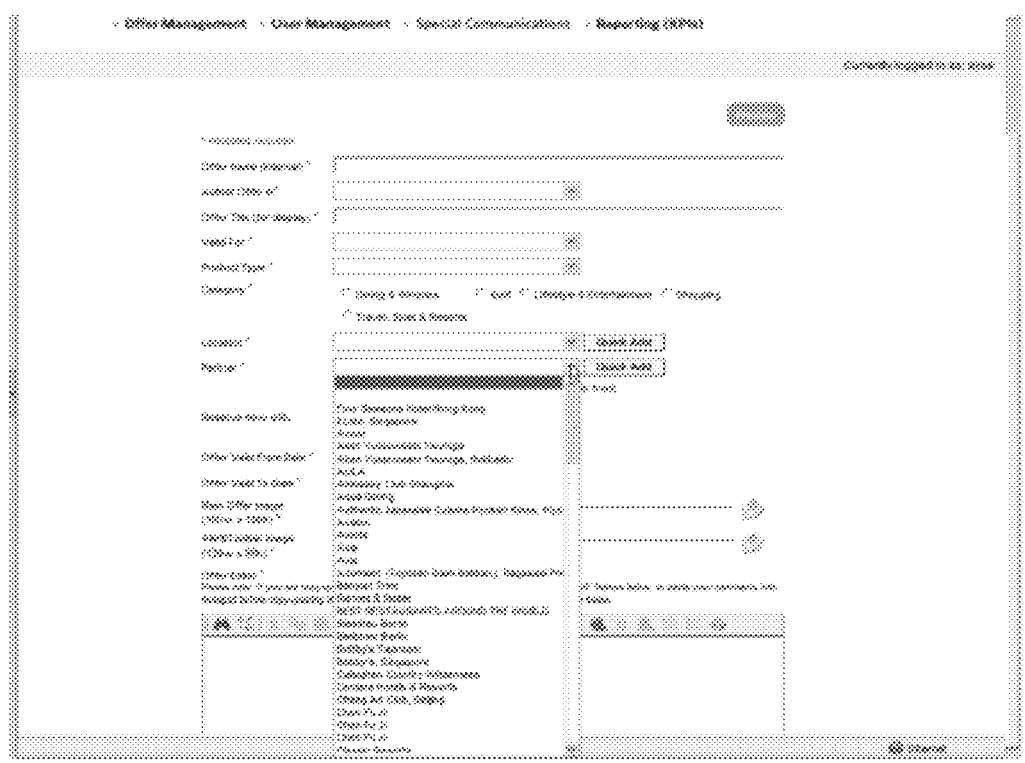

FIG. 6 is a continued explanation of the input screen seen in FIG. 3 where the input screen is depicted at input screen 600. In input screen 600, a "Valid For" field has been explained previously as the pull down menu seen in FIG. 5. Another input field is given for a product type. The product type may be a different type of credit vehicle that is offered by a transaction handler and/or an issuer. Thus, the product type might be an American Express Gold Card, American Express Platinum Card, a Visa Signature Card, a Visa Infinite card, a MasterCard Business Purchase Card, etc. Yet another input field seen on input screen 600 shows a partner from a pull down menu which can be selected, where the partner is an entity who is making the offer to be accepted by cardholders or account holders. As can be seen, the pull down menu shows a variety of merchants that would like to make offers to account holders. By way of example, these offerors include AVEDA, Banyan Tree, Barnes & Noble, Four Seasons Hotel Hong Kong, etc.

Figure 7:
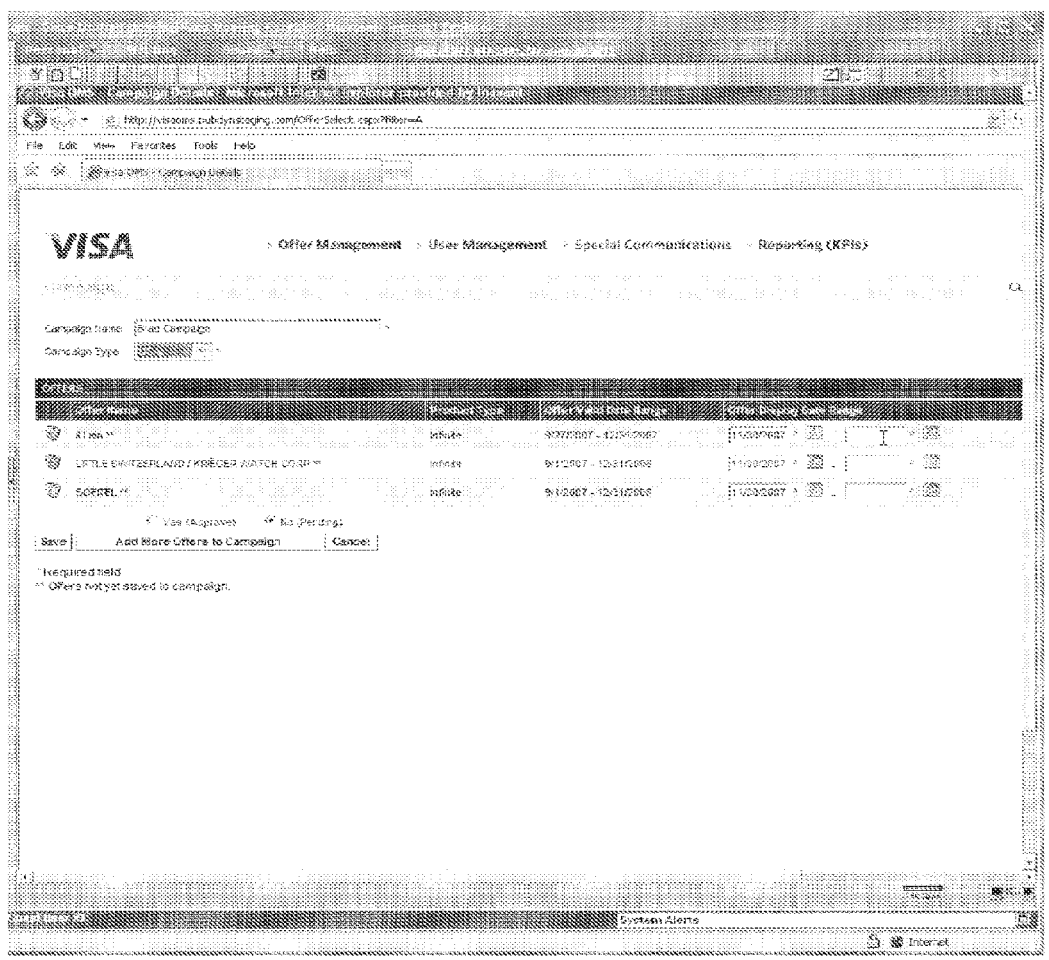

FIG. 7 shows a "Campaign Screen" 700. The name of the campaign is "Brad Campaign" . The type of campaign is shown by way of pull down menu, and specifically refers to the geographic region, in this case being "USA." The various offers within the Brad Campaign are seen, in this case there were three different offers including Il Lido, Little Switzerland, and SOFITEL. The product type is shown, in this case being the Visa Infinite card. The date range is given during which each offer in the campaign is deemed valid, including both a beginning date and an ending date. There is a display given of the date ranges by which offers will be displayed to an accountholder on their branded desktop application. As such, the display date range may be different than the offer validation range. The "Campaign Screen" 700 allows a user to activate the "Add More Offers to Campaign" function so that additional offers can be added under the Offers portion of the data at "Campaign Screen" 700.

Figure 8:

FIG. 8 shows a list of approved offers 800. The list of approved offers 800 shows the offers seen as a list below the caption "Offer." The list of approved offers 800 shows the product type, the list of categories, the locations where the offers will be made, the partners making the offers in conjunction with the transaction handler (in this case, the transaction handler displayed is 'Visa!), the dates by which the offer will be valid and the status as being approved and active in the list of approved offers 800. The list of approved offers 800 shows an operation that can be activated so that the operator of the input screen can continue to the next screen.

Figure 9:
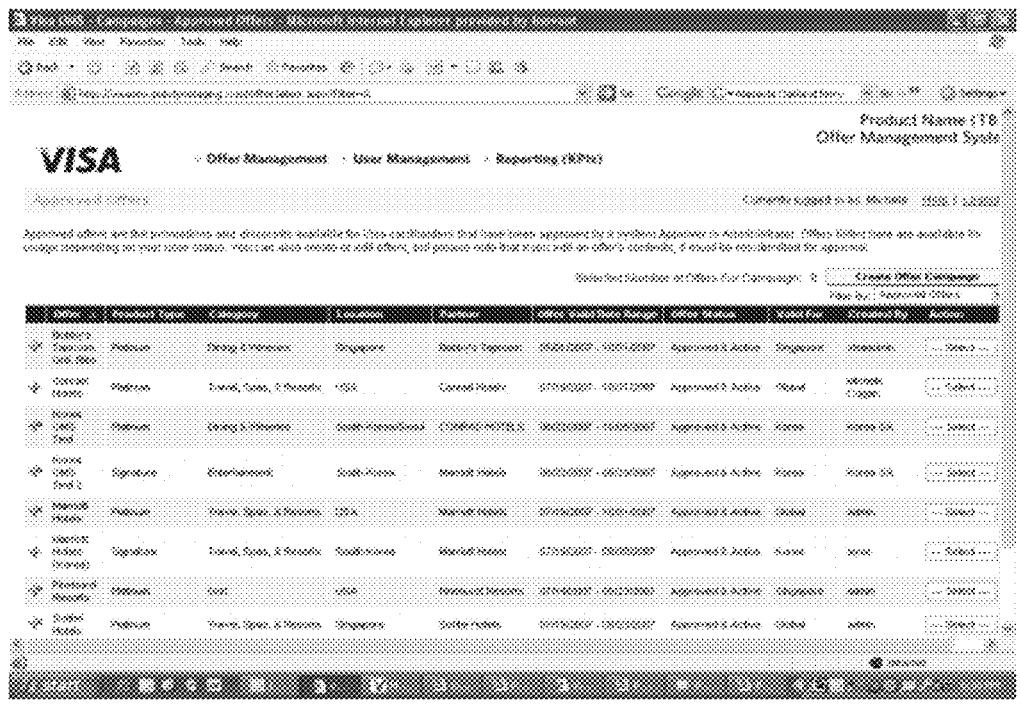

FIG. 9 shows a screen 900 depicting aspects of approved offers. Each offer is characterized by the entity that is making the offer. The product type is listed. The categories of each respective offer is shown. The location at which each offer is being made is indicated in a list. The partner making the offer is listed, respectively, with each offer. The partner may be also referred to in the title of the offer. The date range during which the offer is valid is seen at the screen 900, and the status of each offer is seen below the title. The screen 900 shows the location for which the offer is valid, and the creator of the offer within the offer management system. An indicator as to whether or not any new action has to be taken with respect to each offer is seen below the title "Action".

Figure 10:
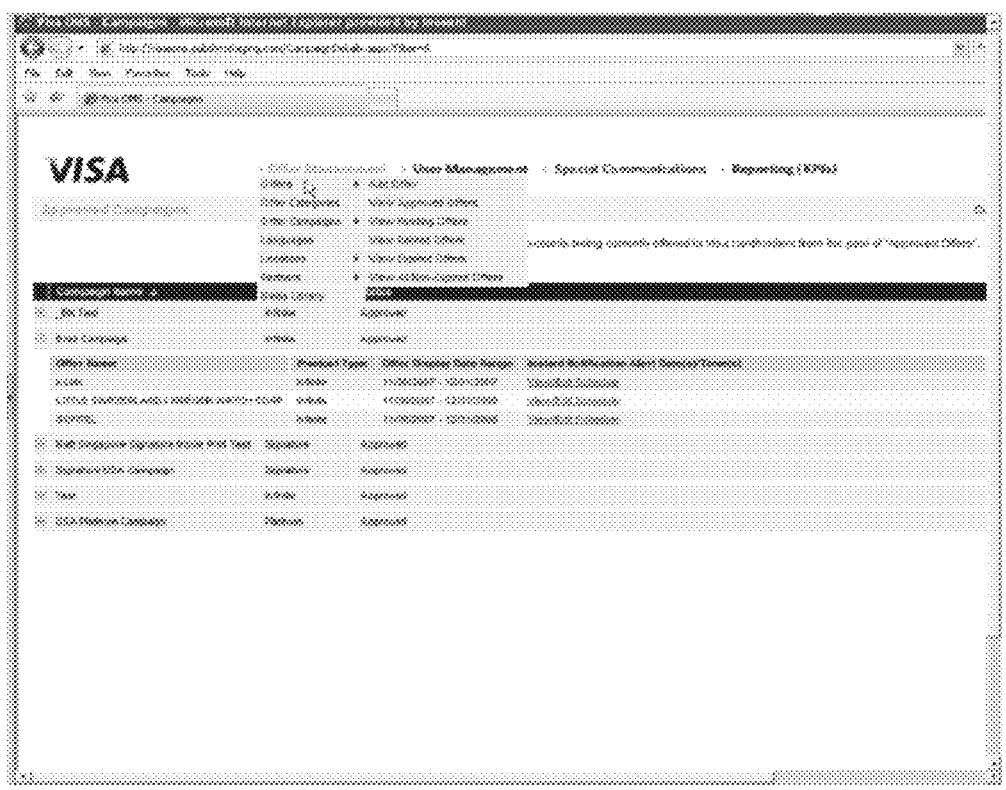

FIG. 10 shows a screen shot 1000 for approved campaigns. The campaigns have been given names under the banner "Campaign Name" . Here it is seen that there are two campaigns: "BK Test" and "Brad Campaign". The offer name banner is listed and shows several offers underneath including Il Lido, Little Switzerland, SOFITEL, Mat Singapore Signature Move Print Test, Signature USA Campaign, Test, and USA Campaign Platform. Screen shot 1000 shows a banner "Product Type" which shows the type of card for which the offer is being made, which here is the "Infinite" product type. Also screen shot 1000 shows the product types as Signature and Platinum. The screen shot 1000 shows the status banner which indicates that the campaign has been approved The screen shot 1000 shows the offer display date range and allows a user to view or edit the schedule by which a cardholder is to receive instant notifications and alerts by dates and times. The screen shot 1000 indicates the product type for each of the offer names, and indicate that an offer is specifically approved.

Figure 11:
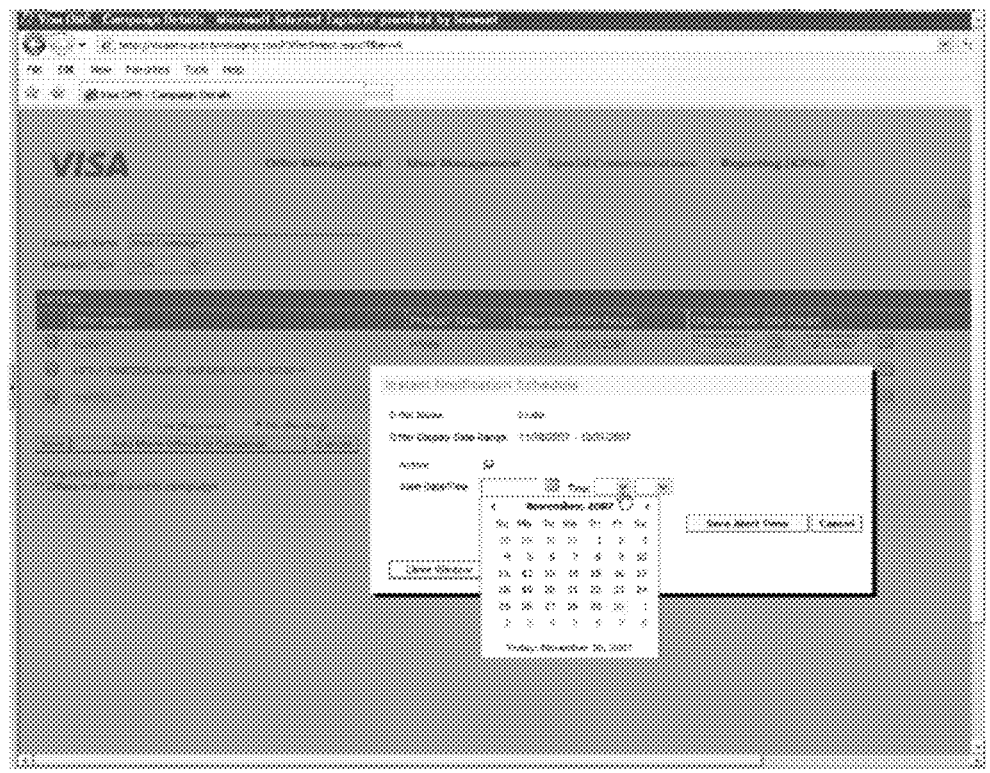

FIG. 11 shows a screen shot 1100 for listing one specific campaign and information about that campaign. Here the campaign name is "Brad Campaign". The campaign type is for the USA. The screen shot 1100 shows each offer name within the Brad Campaign and instant notification schedule. Note that the instant notification schedule corresponds to the previous selection function seen on FIG. 10. The screen shot 1100 shows the name of the offer for which instant notifications and alerts are to be sent and the offer display date range for which instant notifications will be scheduled. The screen shot 1100 indicates that a certain notification is active and the date and time for making that instant notification to a cardholder via a desktop application alert or notification. Alerts and notifications will be further discussed below in reference to FIG. 22.

Figure 12:
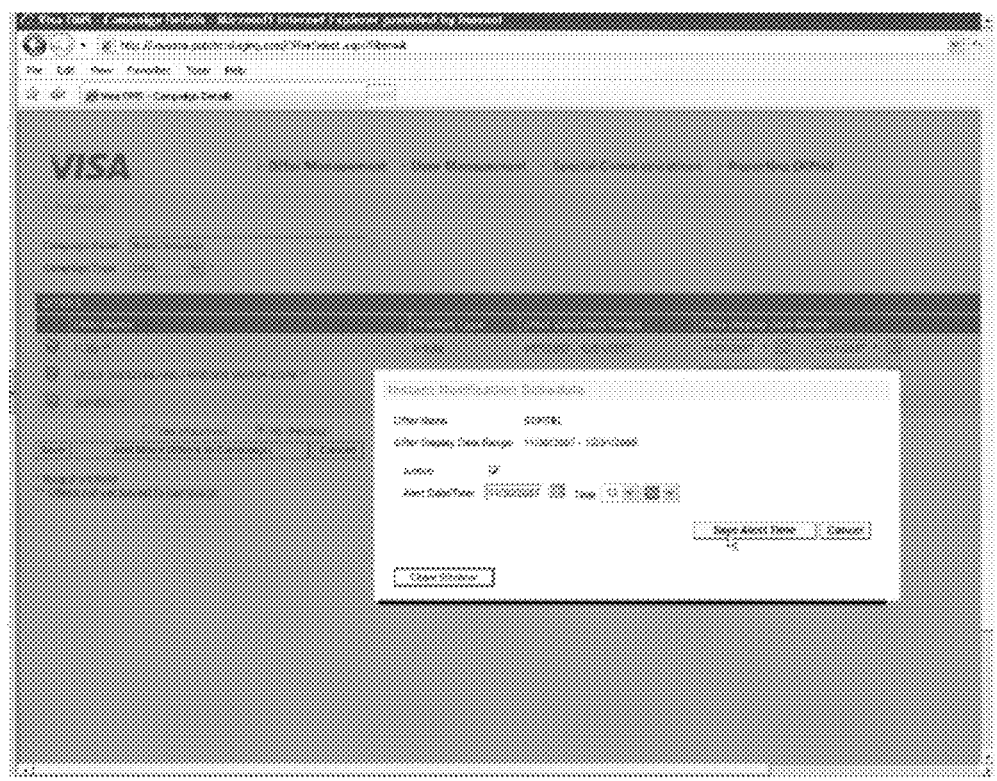

FIG. 12 shows the results of a completed instant notification data element where the offer name is for "SOFITEL" with the date range Nov. 30, 2007 through Dec. 31, 2008, for an active notice where the active alert time will begin on Nov. 30, 2007 at 1:30 in the afternoon. A user can activate the "Save Alert Time" function to save the instant notification alert. Thereafter, on Nov. 30, 2007 at 1:30 in the afternoon, a user will receive the alert of the SOFITEL offer on their branded desktop application in FIG. 22, discussed below, by way of an instant notification alert.

Figure 13:
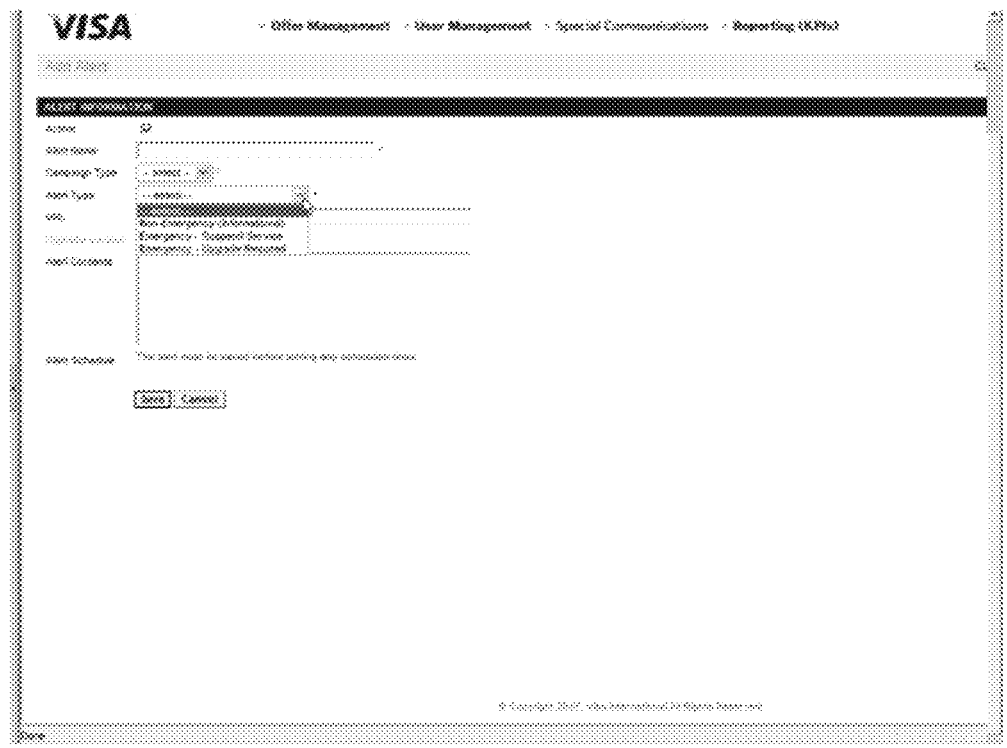

FIGS. 11 and 12 refer to instant notifications, and FIG. 13 refers to alert information to be displayed upon a branded desktop application for the desktop of a user's personal computer. At a screen shot 1300, the "Add Alert" function has been activated. This function provides for facilities to be displayed so that the user is able to add an alert through the alert management system as seen in FIG. 1 at reference numeral 110. Offers, as described in FIGS. 9 and 10, are maintained through the offer maintenance system 108 seen in FIG. 1. Together, the instant notifications and the alerts are operated and maintained through the offer and alerts management system 106 seen in FIG. 1.

Referring again to FIG. 13, screen shot 1300 shows that alerts can be added. Also seen in FIG. 13 are the activation status of the alert by way of a check box, and the alert name given in an input field which can receive input by a person in charge of data entry into the alert maintenance system 110 as seen in FIG. 1. The screen shot 1300 indicates the type of alert that the alert name pertains to and is particularly selected by way of a pull down menu. The screen shot 1300 shows that the user can input a URL that corresponds to a link that the user of the PC receiving the link can follow in order to respond to the alert that is delivered to the user's PC. The contents of the alert can be entered and the alert schedule can be seen. The scheduling of an alert can be by way of input similar to the input of date range in FIG. 12 and in FIG. 13. The screen shot 1300 indicates that the user can save the created alert.

Figure 14:
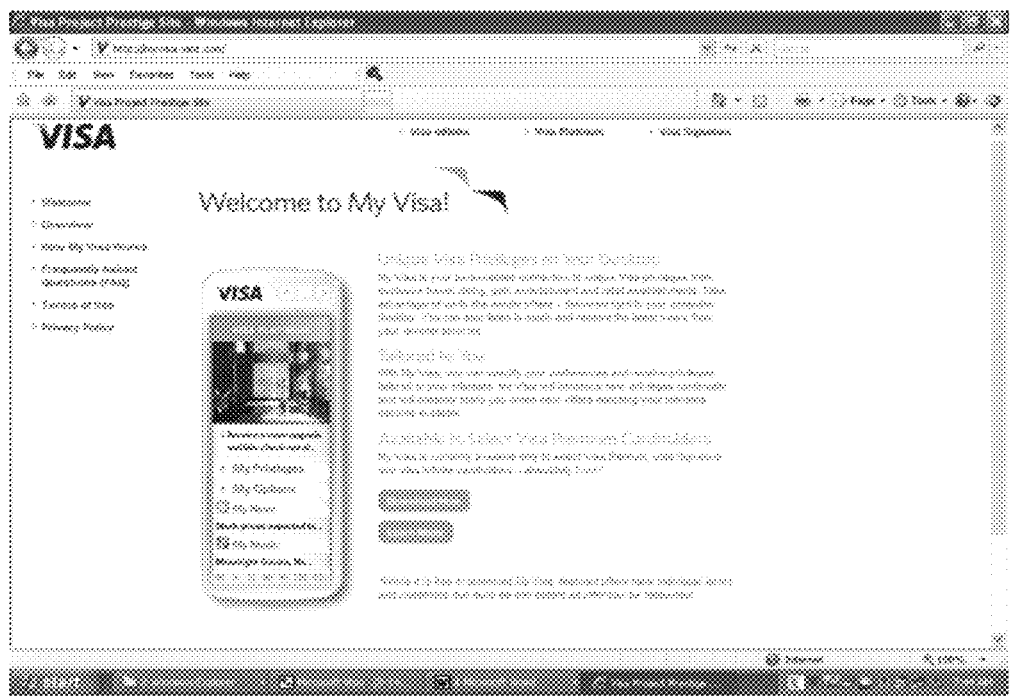

Referring now to FIG. 14, a web page is rendered by a browser on a PC having a link to download a branded desktop application (BDA) for installation on the PC. The BDA will provide offers and alerts to the PC according to preferences to be designed by the PC's operator.

Figure 15:

FIG. 15 shows a desktop 1500 of a user's PC. A second desktop is seen and upon the desktop 1500 is a Branded Desktop Application (BDA). In this case, the brand is the 'Visa' brand. An icon is seen in the system tray of the second desktop. By activating the icon a double click function, BDA toolbar is activated and is rendered upon the second desktop.

Figure 16:
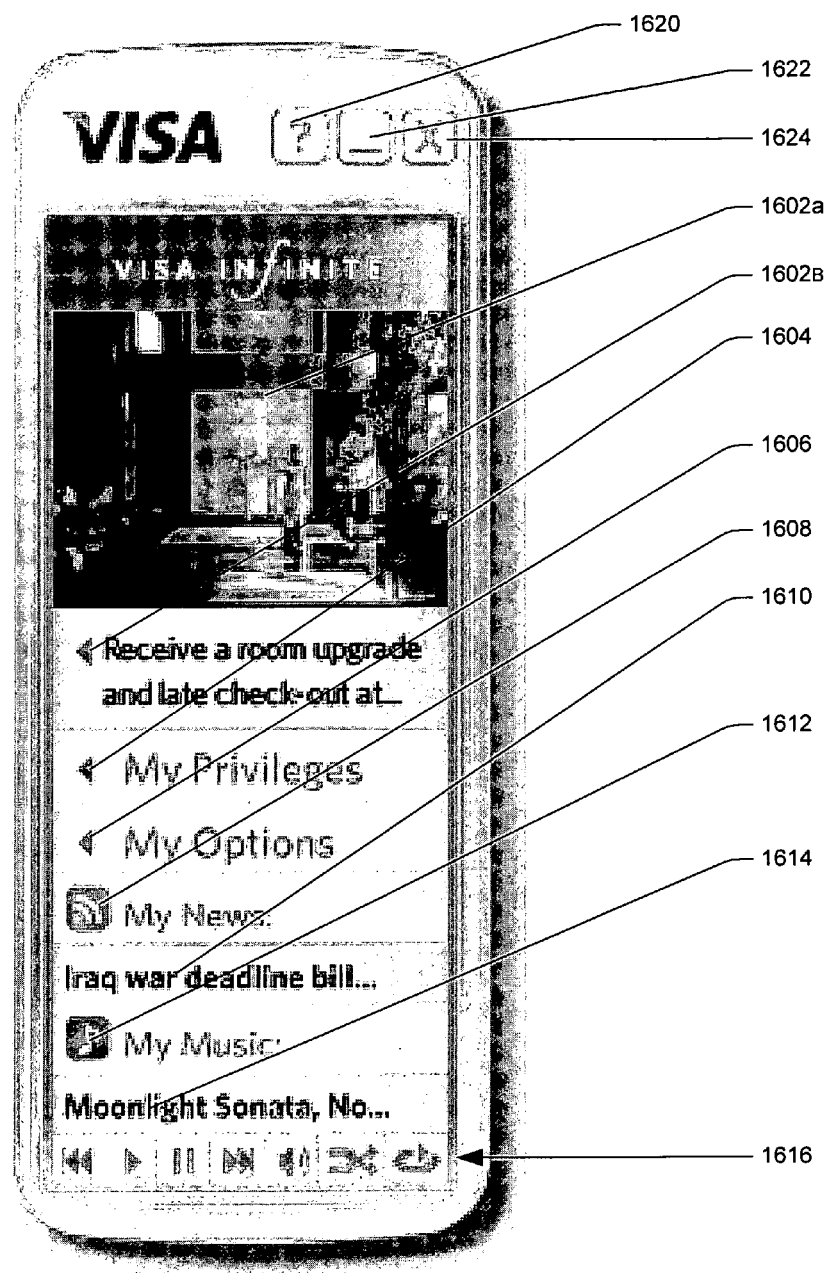

Turning now to FIG. 16, a BDA toolbar 1600 is seen. As referred to herein, the BDA toolbar 1600 is operated by the user of a PC. The BDA toolbar 1600 is the main area of the branded desktop application. The BDA toolbar 1600 has five main features as described below. A privilege area depicts a rendering of particular highlights that meet the preferences in the top area of BDA toolbar 1600. Pictures of the privileges, along with brief introductions, are shown scrolling as a banner across an area of BDA toolbar 1600. The user can click on the arrow at any time to open up an expanded screen and view its details, as discussed below. By clicking on the arrow next to "My Privileges" , the privileges in the privilege highlights area are revealed in greater detail with additional information, including redemption instructions of a depicted offer or alert. For instance, a telephone number or a web site link of a merchant having an ad in the offer is provided for quick and convenient offer redemption. With the expanded screen, as discussed below, the user can print the privileges details with a single click. The "My Privileges" arrow reveals details of the privileges of the account holder corresponding to the BDA toolbar 1600. Clicking on the "My Privileges" arrow provides the user with an overview of all privileges that meet the user's preferences. The user can view this information by category (such as golf, dining, travel, etc.) or by location (such as Singapore, Korea, United States, or Hong Kong, etc.). When a user clicks on a "My Options" arrow of BDA toolbar 1600, the "My Options" toolbar feature allows the user to change their preferences and to access supporting resources such as online help, premium product websites, an Automatic Teller Machine (ATM) locator, which enables a user to locate closeby automatic teller machine, as well as other information about BDA toolbar 1600 and the branded desktop application it refers to. Clicking on the "My Options" arrow refers to the "My News" section of BDA toolbar 1600. By doing so, the user can see the headlines of news articles scrolling as a banner within this area. By clicking on the headline, as further discussed below, the user can read the entire article associated with that headline. The user can also click on "My News" to subscribe to other news features (i.e., click on 'add news feed' and enter the Rich Site Summary (RSS) or Atom URL) or change existing ones (i.e., click on the 'X' to remove the news feed). The particular headlines that scroll as a banner is seen at the "My News" section of BDA toolbar 1600. By clicking on the musical note seen at 1612, the user's PC will render audio of music that the user can listen to in the "My Music" portion of the BDA toolbar 1600. One option is to listen to a selection of songs provided by a BDA web service. Another option that the user can choose is to render music from their own music library resident on the user's personal computer. For instance, audio-music files may reside in the 'My Music' file directory of the user's personal computer. As seen at another area of BDA toolbar 1600, the title and artist (not shown) of the song currently being played is rendered as a banner on BDA toolbar 1600 so that as to scroll across BDA toolbar 1600. User controls for the rendering of the audio-music files are provided. These controls can be used by the user (in the order provided) to skip to a previous song, play the song, pause, skip to the next song, increase/decrease the volume, turn on/off the shuffling of songs in the play list, or play the current song that is playing. The user can also click on 'My Music' to change the play list that the user is listening to. To listen to the user's own music library, the user can click on the 'Edit my Soundtrack' and then point their cursor to a directory on the user's hard drive that contains music files. The user can then switch back and forth between their own music and the selection of songs provided by the web service that provides the BDA by clicking on the 'Play' box in the 'My Music' section that is associated with the soundtrack.

The RSS news feed scrolling as a banner, and the music being streamed as indicated by the scrolling banner, can be received from one or more gadget web services or widget web services, as are seen at reference numeral 124(*g*) in FIG. 1. In this case, the BDA toolbar 1600 would be represented by the client desktop/PDA 102(*a*), which is in communication through network 130 with these web services 124 (*g*) for the provision of multimedia thereto (e.g., audio and new feeds for rendering). By providing a user with these and other desirable gadgets and widgets through a Branded Desktop Application (BDA) that also provides the user with special offers that are specifically tailored to the user's interests, the user is more likely to constantly keep the BDA executing and observable on the desktop of the client being operated by the user. As such, there is an increase in the frequency that the brand is seen by the user, resulting in increase user brand awareness.

As used herein, references are made to privileges for special guests, offers, opportunities, discounts and more for cardholders of various levels of transaction handler products. For instance, these transaction handlers include Visa, MasterCard, American Express, Diner's Club, etc. The products offered by same can be hierarchically arranged. For instance, the product can be a platinum card, a signature card, an Infinite card, a gold card, a basic card, etc. The privileges for each such product can also be hierarchical in terms of value or scarcity, including offers such as exclusive travel, discounts on dining or golf or travel where any such offer may be offered anywhere in the world.

The provider of offers and services will periodically examine whether the particular PC user corresponding to an account qualifies for privileges that meet the account holder's preferences. As such, offers can be made by the provider at any time, and these privileges may be delivered as offers to user's BDA toolbar 1600 at any time of the day or night.

Occasionally a user will be offered an instant notification. An instant notification is a message that lets the user know that a special offer has arrived that meets the user's preferences. It will be rendered on the user's desktop seen in FIG. 15 in the user's system tray. When the user clicks on instant notification message, the PC will have rendered specific details on the desktop about the privileges that are being offered. If a user closes an instant notification message by clicking on the X in the upper right hand corner of the instant notification message, the offer will still be available to the user. The user can access the offer by locating the offer in the BDA toolbar 1600 or by going into the 'My Privileges' section of the BDA toolbar 1600. All offers can be configured to remain until they expire. If the user misses an instant notification, where the instant notification is currently open on the user's computer that has not yet been closed, if the user is not on line or if the user is not using the BDA toolbar 1600 at the time an instant notification message is scheduled to appear, the user will not receive the notification.

However, the user can still receive the offer by checking the BDA toolbar 1600 or the 'My Privileges' section to see if there have been any new offers made to the user.

Alerts and other special notifications, in addition to instant notifications, may be sent to the user's desktop through the BDA toolbar 1600. For instance, an example of a special communication that may be used is asking the user to participate in a survey, or otherwise alerting the user about certain aspects of their account to which they should be alerted. For instance, an alert may be sent to the user's desktop through the BDA toolbar 1600 as seen in the system tray in FIG. 15 to the effect that a fraud incident may be occurring in real time and the user's input about that incident is requested. Again, these special communications can be configured to look similar to the instant notification and also appear in the system tray of the user's desktop as seen in FIG. 15.

Figure 17:
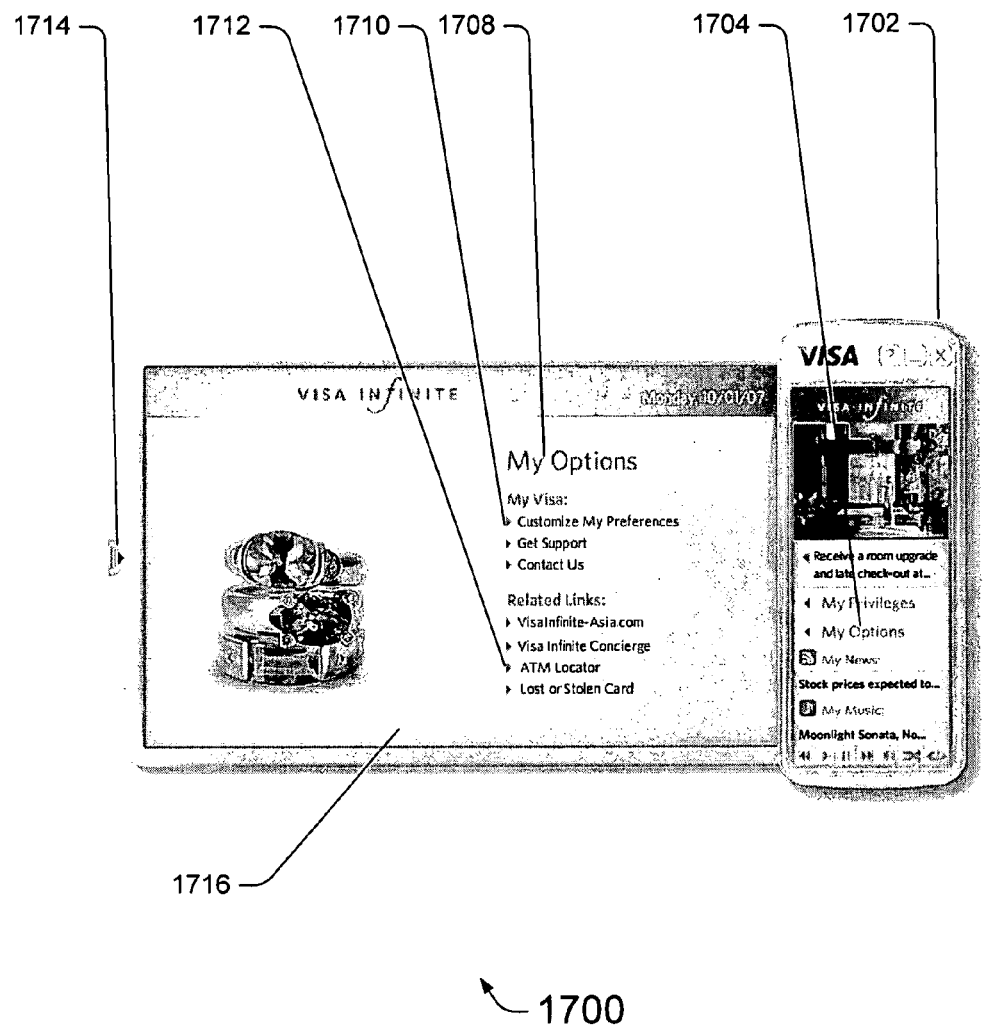

By clicking on the "Download Now" function indicated in FIG. 14, the screen shot 1700 seen in FIG. 17 will roll out from BDA toolbar 1400. Referring now to FIG. 17, the BDA toolbar in the screen shot 1700 has a function titled "My Options." By clicking at "My Options" function, the static image on the screen an adjacent screen rolls out from BDA tool bar upon the user's desktop. Upon the screen shown adjacent to the BDA tool bar, the "My Options" list is shown. Under "My Options" in the screen shown adjacent to the BDA tool bar the ability for the user to customize their preferences under "Customize My Preferences" is depicted and provides a function is depicted that, when activated, will show a user the location of an automatic teller machine closest to the user's location. The screen shown adjacent to the BDA tool bar shows a button that a user can click on to collapse the screen back into the BDA toolbar. Thus, by retracting the screen shown adjacent to the BDA tool bar through by clicking on the button, and by rolling out the screen shown adjacent to the BDA tool bar through the "My Options" function on the BDA tool bar, the user can respectively take up and conserve space on their desktop when using BDA toolbar.

Figure 18:
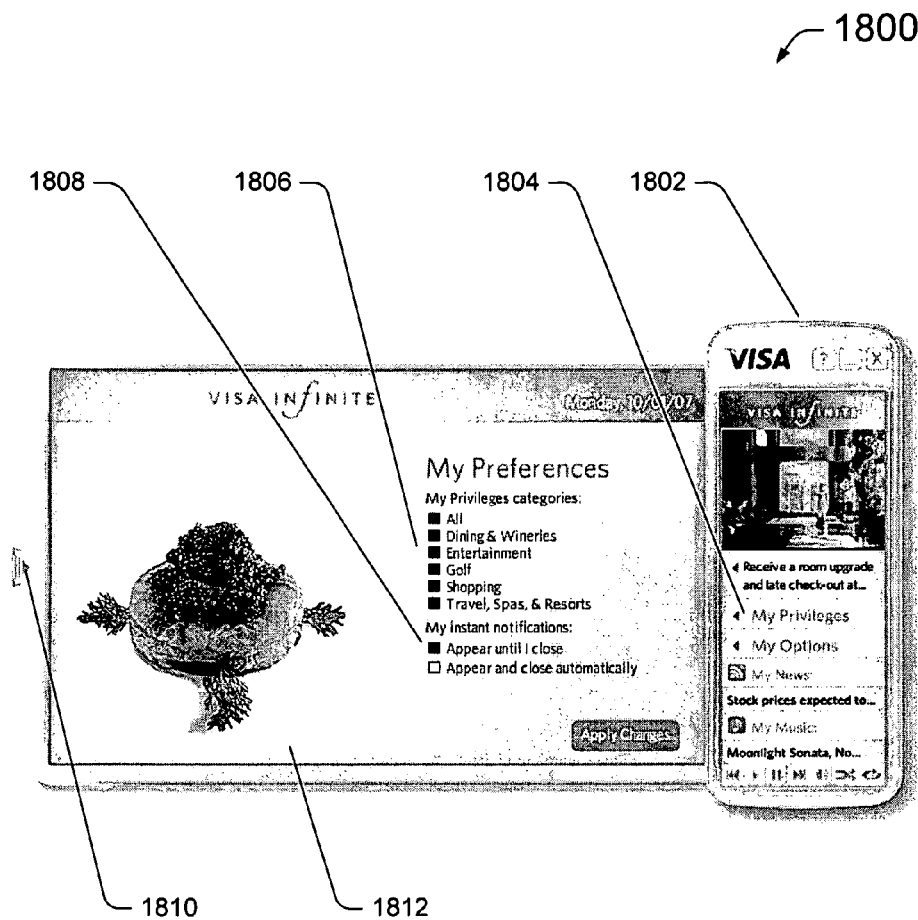

By clicking on the function "Customize My Preferences", the BDA in FIG. 17 will transition to BDA toolbar seen in FIG. 18. In particular, the user can select preferences that BDA toolbar in FIG. 18 will display as shown in the list below the title "My Preferences". Also, the user can select which instant notifications are to be received and the method that they are to be displayed upon the user's desktop. The BDA toolbar can have its screen retracted when the user clicks on "My Privileges" function thereby reducing the foot print that BDA toolbar has upon the user's desktop.

Figure 19:
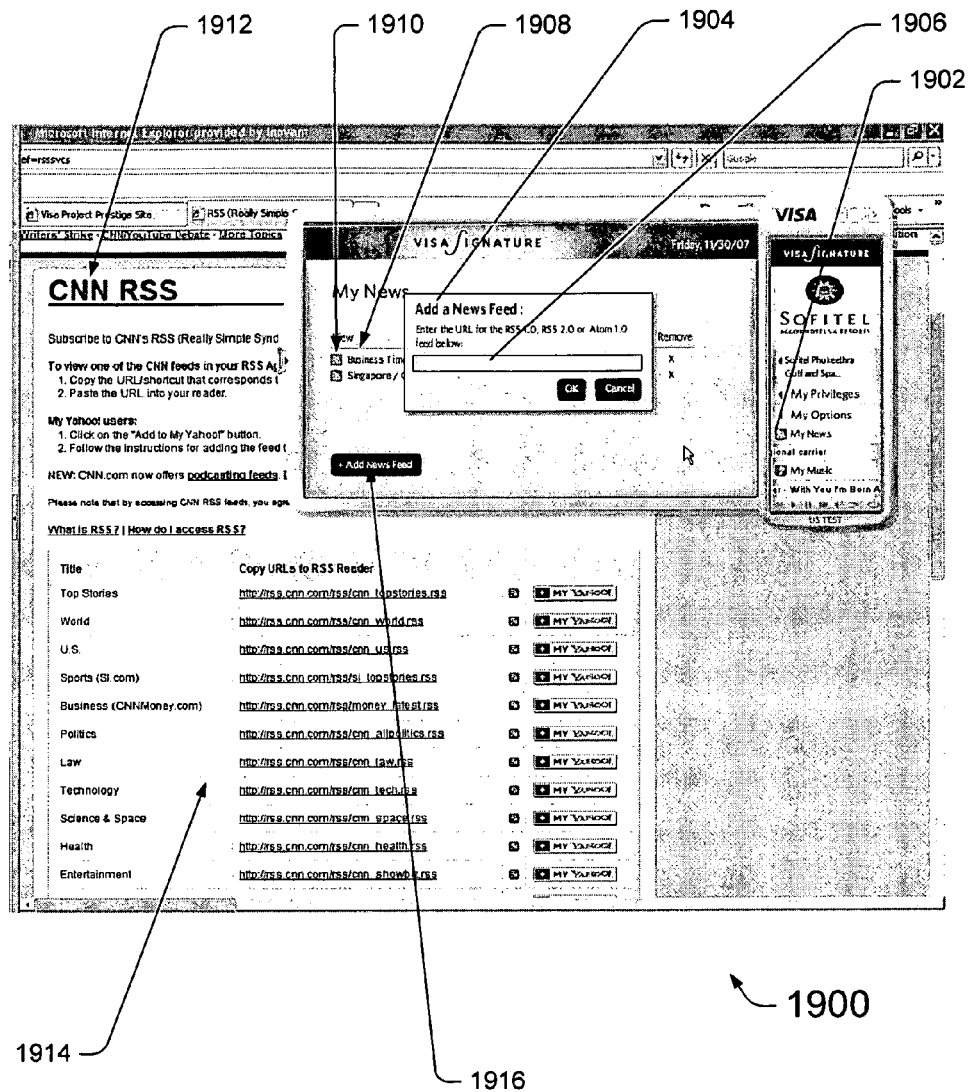

FIG. 19 shows a user's desktop at 1900. Desktop 1900 has a "My News" BDA toolbar with a function thereat for an RSS feed. Upon activating the button at "My News" BDA toolbar, such as by double clicking, the "Add a News Feed" function, new screens will appear, such as the "Add a News Feed" screen shown in FIG. 19. In particular, the "Add a News Feed" screen allows a user to enter a particular news feed URL that is to display in the form of a scrolling banner. Thus, news can be seen scrolling across an area within the desktop 1900 where that news is found at the URL entered in at the "Add a News Feed" screen. The area within the "Add a News Feed" screen gives instructions to the user for adding a news feed, where another screen shows the name of a newsfeed and indicates an icon that depicts that the URL of a news feed is being described. Following the entry of a URL, a user can save the addition of the news feed to their BDA by clicking on the button "Added". The desktop 1900 indicates that a website titled "CNN RSS" has been navigated to on the user's browser where this website includes a series of news streams. The "My News" BDA toolbar corresponds to the "My Options" arrow of BDA toolbar 1600 seen in FIG. 16 and the clicking on "My Options" arrow of BDA toolbar 1600 will cause the navigation to "My News" of the BDA toolbar as seen in FIG. 1900.

Figure 20:
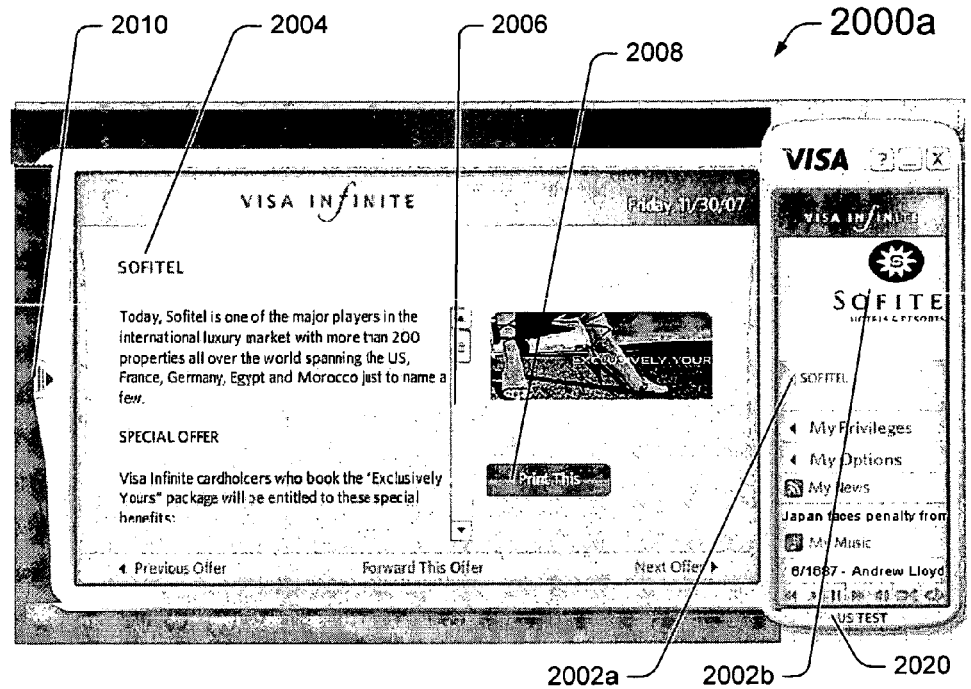
Figure 20:
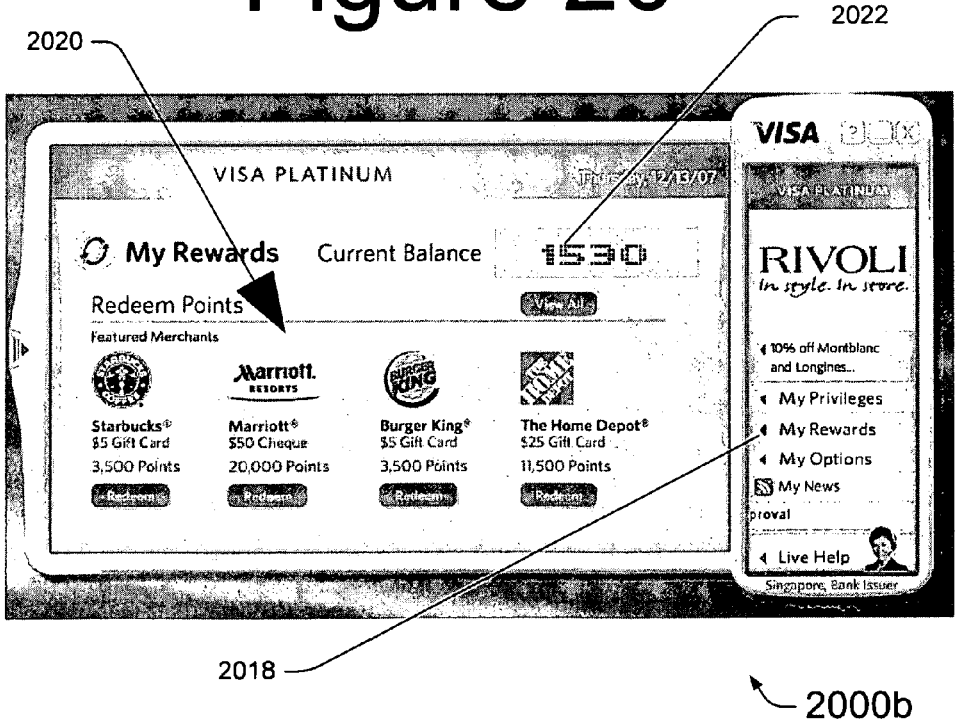

FIG. 20 shows a screen shot 2000a of a BDA toolbar in an expanded view thereof. By clicking on function "SOFITEL" arrow on the BDA tool bar in screen shot 2000a, the images in the adjacent screen to the BDA tool bar in screen shot 2000a will appear, which in this case is an advertisement for the advertiser SOFITEL. The name of the advertiser seen at the "SOFITEL" arrow on the BDA tool bar will scroll as a banner. A static image of the offer will be further detailed in the areas in the adjacent screen. The offer details display on the BDA toolbar in the screen shot 2000a can be scrolled by activating the scroll bar, and the offer can be printed out by activating a print function. To retract the screen showing the offer, the user clicks a screen retracting function, shown to the far left in FIG. 20, and BDA toolbar in the screen shot 2000a will be seen without the scrolled out offer screen. To recap, the offers being made to a cardholder are indicated by clicking on the "SOFITEL" arrow on the BDA tool bar which is a scrolling display of the offer, where the offer has a statically displayed image, and a static image is seen below by way of textual and visual descriptions at the adjacent screen. As can be seen, the offer date is Friday, Nov. 30, 2007 for an account holder of a 'Visa Infinite' card for an exclusive offer from an entity titled "SOFITEL".

In an alternative implementation, the offer details display on the BDA toolbar in the screen shot 2000a can be accepted by the user to proceed into a transaction conducted on the user's account in an eCommerce environment. As such, offers that are served to the BDA can accepted by the BDA and then facilitated by the BDA in an automated end-to-end purchase of products and/or services. The facilitation of the e-commerce transaction can be implemented so as to include the following: (a) security functionality within the eCommerce transaction; (b) automated electronic form fills for selection of a particular account of the user to which the e-commerce transaction is to be billed; (c) automated electronic form fills for selection of a shipping address to which goods are to be shipped and/or a location at which a service is to be rendered; (d) an alert that confirms the acceptance of the e-commerce transaction on the user's account; and a storage and retreival function for a history of the e-commerce transactions that have been conducted by the user's use the BDA.

A BDA toolbar is seen in the extended position thereof at screen shot 2000b where a function seen "My Rewards" has been activated to scroll out the depiction of the rewards offered to a cardholder. These rewards are depicted numerically showing a current balance of 1,530 points which may be redeemed by any one of the options selected below the "Current Balance" demarcation. Note that this BDA toolbar is for a Visa Platinum cardholder and is dated Thursday, Dec. 13, 2007. As such, the user has sufficient points for any one of the offer-for-points depicted: Starbucks, Marriott Resorts, Burger King, and the Home Depot.

FIG. 21 depicts a BDA toolbar at screen shot 2100a in the expanded position thereof which shows various add on features for the BDA which allows functions to be incorporated on the user's personal computer. In particular, the functionality added to BDA in the screen shot 2100a is the ability to check the user's PC for malicious software, to perform a windows firewall function, and to provide an anti-phishing filter which may be turned on or off, and also to check for updates to the user's operating system. BDA toolbar in the screen shot 2100b is related to BDA in the screen shot 2100a. As such, BDA in the screen shot 2100b shows the result of the functions performed for malicious software which were initiated in BDA toolbar in the screen shot 2100a and displayed by way of completion results displayed in BDA toolbar in the screen shot 2100b.

Figure 22:
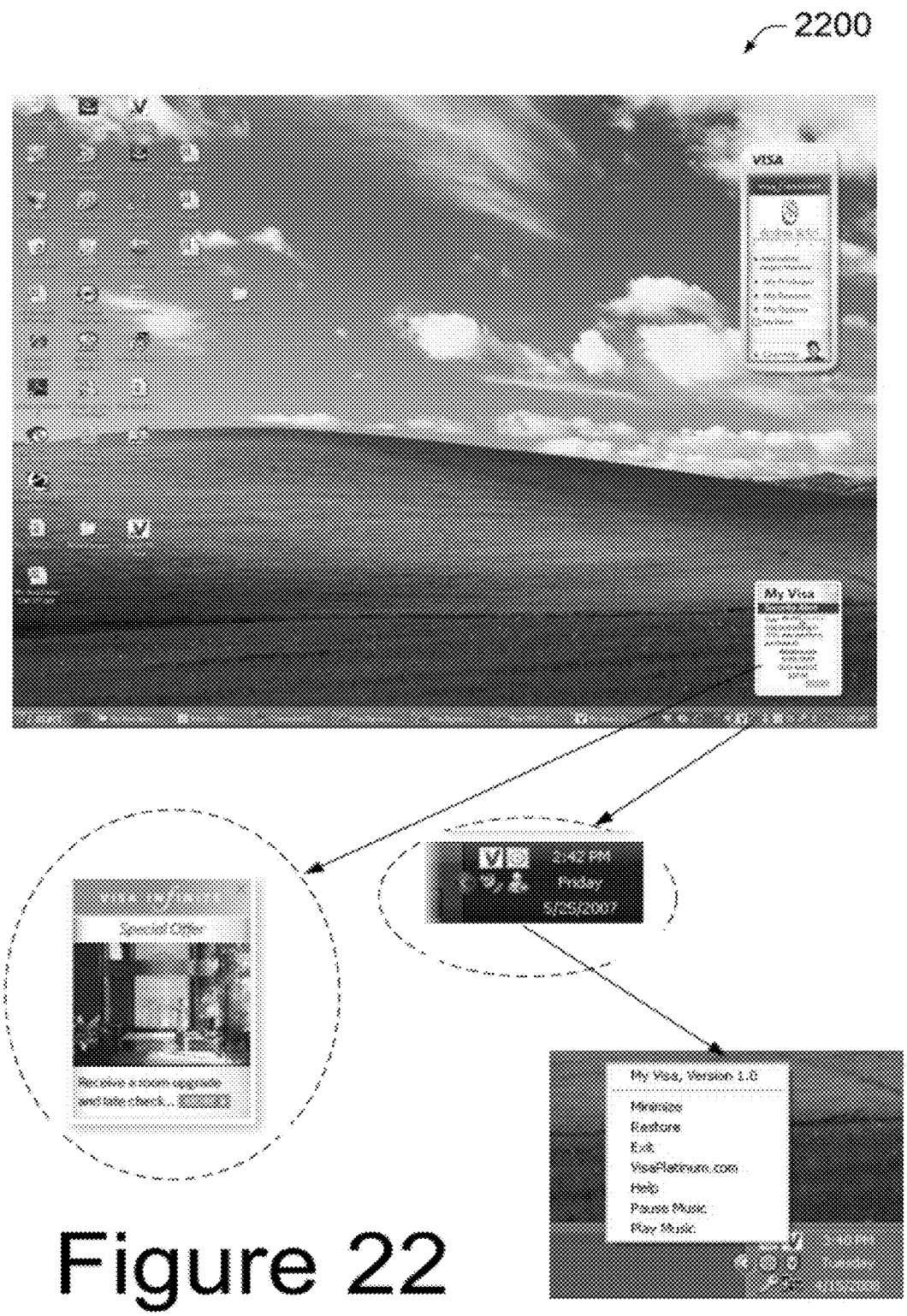
Figure 23:
Figure 23:
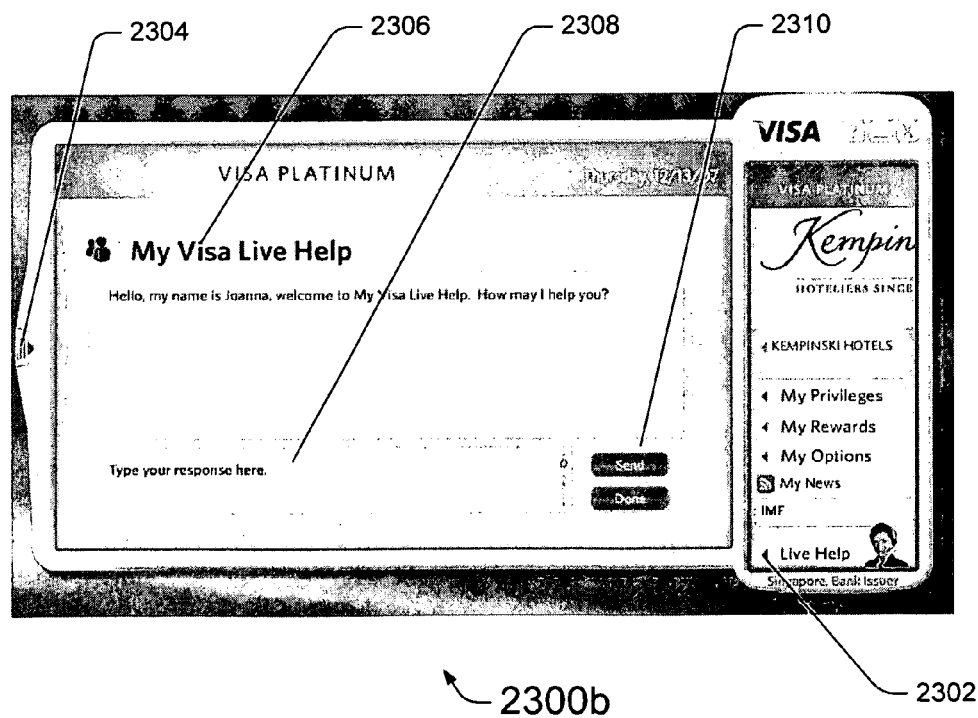

FIGS. 10-13 are related to the screens seen in FIGS. 22-23. In particular, the view date for offers during which a user will receive an instant notification is seen in FIG. 10, where the specific instant notification information was set up by way of input by a user as shown in FIGS. 11-13. These instant notifications and alerts can be seen on a user's desktop in FIG. 22. The BDA toolbar appearing on the desktop in FIG. 22 is seen in the collapsed position thereof. A BDA icon is shown in the system tray of desktop. Here the BDA icon is shown in the form of a stylized "V". When a user 'right clicks' on the stylized "V", a pop menu appears on desktop 2200. The full functionality of the system tray icon, via the right click function of the stylized "V" icon, allows the user to select from the options in a menu that includes: (a) Minimize -minimize the BDA toolbar to system tray; (b) Restore: activates the BDA toolbar to pop-up on the desktop 2200 back to its original state; (c) Exit: removes the BDA application from the system tray of desktop 2200 ; (d) Product website link; (e) Help: links to the Customer Support Site (e.g.; http://visa.com/myvisa); (f) Pause Music; and (g) Play Music.

A security alert appears on desktop 2200 as well as a cutout of a special offer seen in a broken line oval outside of the desktop 2200 2. As implemented, however, both the alerts and instant notifications appear above the stylized "V" icon in the user's system tray. A user can interact with the alert or the instant notification through the BDA toolbar in FIG. 22. In particular, the user can act in response to an alert by selecting the live help option.

The security alert on desktop 2200 in FIG. 22 is shown in greater detail at 2300a in FIG. 23. In particular, reference numeral 2300a shows that a security alert has been sent directly to the desktop of the user through the BDA application executing on the user's PC. This particular security alert gives the user notice that their Visa card ending in the digits "3586" had been used for a purchase at a website "Amazon.com" on Sep. 22, 2007 at 12:10 a.m. (EST) and that the purchase was for $37.49. In the event that the user sees the security alert in FIG. 23 as appearing on their desktop 2000 in FIG. 20, the user can click on the live help button as seen in the BDA toolbar 2300b in FIG. 23.

Alert 2300a can be enhanced with a sequence number of a debit, credit, or prepaid card that corresponds to the account number of the corresponding to the account. Optionally, this enhancement can also be seen by clicking on the "MORE→" icon seen on alert 2300a. The sequence number is used for multiple different cards having the same account number, as is common where a plurality of family members use a card bearing the same account number, and where each card is distinguished from the others by the sequence number. Additionally, alert 2300a can be enhanced with an identifier of the types of commodities offered by the merchant of the transaction for which the alert applies. As such, a review of alert 2300a can allow a consumer to better remember whether consumer participated in the transaction or whether the transaction was likely to be fraudulent.

It is possible that one or more alerts may be sent to user's desktop during a time period that the user was not 'on line'. As such, the user would not be aware of any such alert. In an alternative implementation, each such alert would be stored for later delivery to the user's desktop. When such alerts have been stored, the user would be served a supplemental alert to their desktop giving notice that alerts have been stored for subsequent delivery and review by the user at the user's desktop. As such, the user can 'catch up' on all of their as-yet-unseen alerts. As such, the BDA provides an ability for the user (i.e., "cardholder") to store alerts and instant notifications in the event the user does not see the alert/instant notification at the time it is rendered from the system tray and/or when the user is not using their computer at the time that an alert was generated. The user also would have the option to delete or store each such alert as part of the afore-described "Customize My Preferences" option in FIG. 17 in the "My Options" area.

In a still further implementation, the Offer Management System (OMS) can deliver and distinguish between important and non-important or non-urgent alerts. The OMS can send out different types of alerts and the BDA can distinguish these categories and determine how to display them to the user. For example, an alert predetermined to be an 'important alert' would have a different design (i.e., in an alternative audio and/or visual intensity) than an alert predetermined to be an 'non-important alert', each of which would also have different display features such as being persistent vs. non-persistent on the user's system tray.

Once the user clicks on function "Live Help" on BDA toolbar 2300b, the expanded position of the BDA toolbar 2300b is revealed. In the expanded position, a user can begin a live chat with a web service. The web service helps the user respond appropriately to the security alert 2300a. The user may input their response to the security alert and the live chat response thereto will appear in an interactive session with a person (or artificial intelligence entity) who can help the user respond to the security alert. Such a person may be an agent of an issuer, an agent of a manufacturer, an agent of a merchant, an agent of a transaction processor or other party that can help the user deal with the security alert that has been received. By way of example, the user can indicate that an unauthorized purchase was underway or had already been conducted by the user's review of the information appearing in the security alert 2300a. Once the user has finished typing text as a response, the user can send the information to the live chat web service by clicking on a function, such as a "Send" function shown in the BDA toolbar 2300b. When the chat has been concluded, the user can click on another function to move the BDA toolbar 2300b to the collapsed position thereof.

Figure 24:
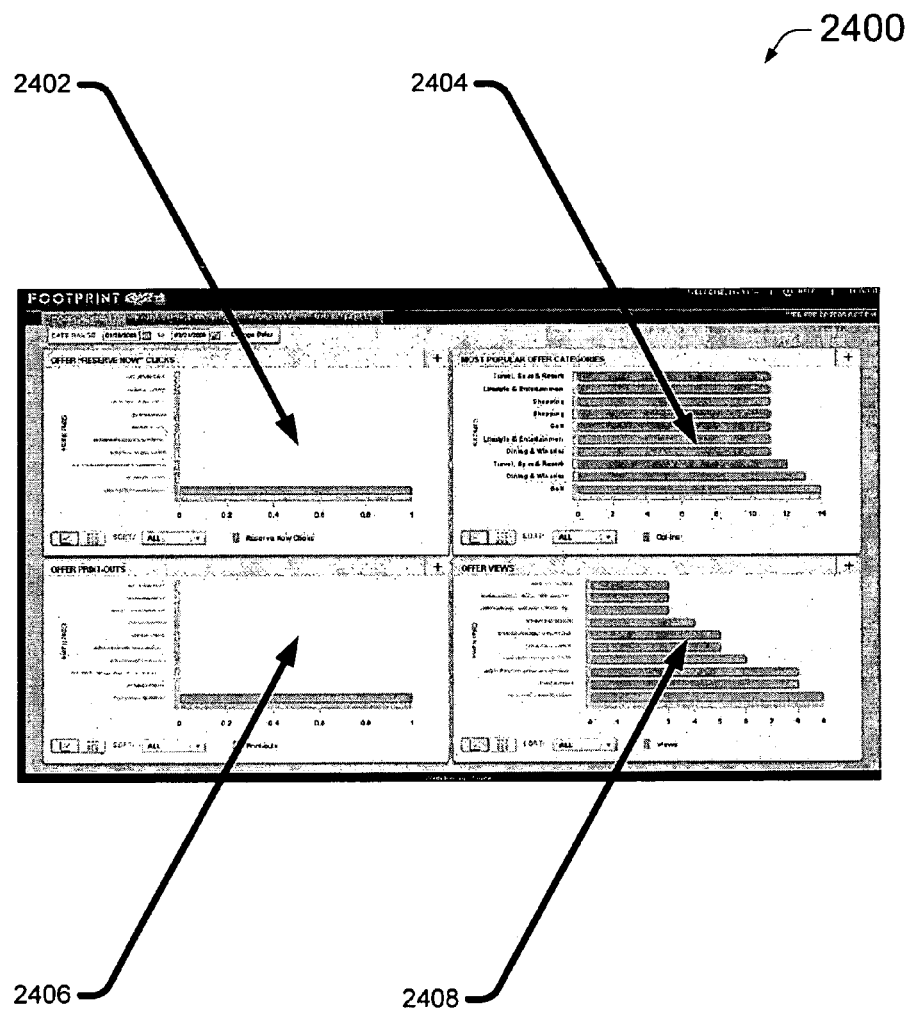
FIG. 24 is a report displayed on a client for the reporting of key performance indicators for an offer and alerts management system.

FIG. 24 shows an operation labeled "Reporting (KPI's)". This operation, when activated, performs reporting on key performance indicators of offers being made to cardholders through the desktop branded applications described herein. A depiction of the results of such key performance indicators is seen in FIG. 24 at reference numeral 2400. This display can be rendered in conjunction with the Offer Performance Indicator System 112 seen in FIG. 1. An "Offer-Reserved Now Clicks" region, reports on the number of offers that are being acted upon by BDA users. Such action includes reserving an offer as a 'Reserve Now Offer'. FIG. 24 shows the most popular offer categories among all responses by all BDA users. Reference numeral 2400 shows how many offers have been printed out by BDA users and how many offers have been viewed by BDA users.

The Payment Processing System

Figure 25:
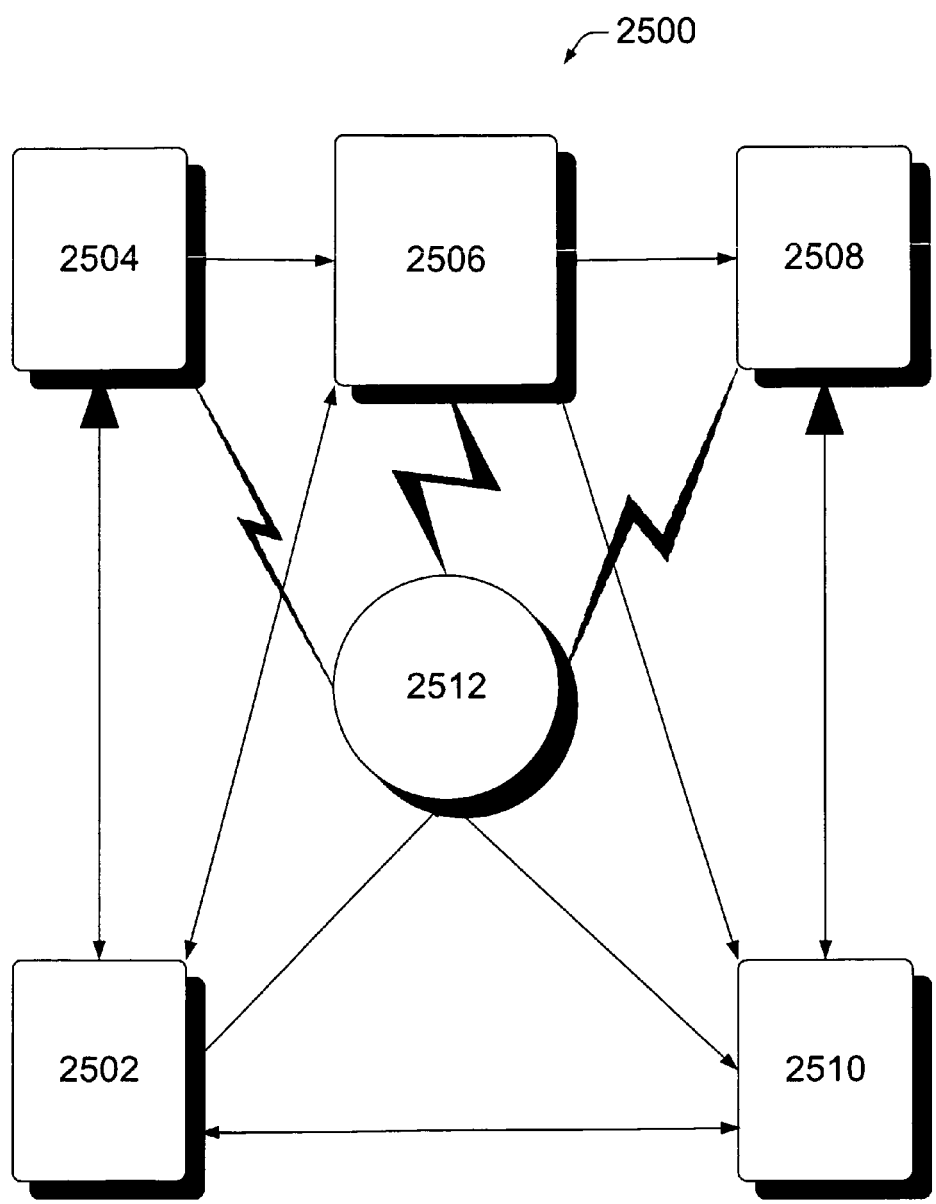
FIG. 25 illustrates a block diagram of an exemplary payment processing system within which the exemplary environments, methods, screen shots, and reports of FIGS. 1-24 may be practiced.

FIG. 25 illustrates a block diagram of an exemplary payment processing system 2500 within which the exemplary environments, methods, and process of FIGS. 1-24 may be practiced. As will be readily understood by persons of ordinary skill in payment processing systems, a transaction such as a payment transaction in a payment processing system can include participation from different entities that are each a component of the payment processing system. The exemplary payment processing system 2500 includes an issuer 2504, such as the issuer; a transaction handler 2506, such as the transaction handler; an acquirer 2508, such as the acquirer; a merchant 2510, such as the merchant; and a consumer 2502, such as the consenting consumer. The acquirer 2508 and the issuer 2504 can communicate through the transaction handler 2506. The merchant 2510, such as the utility provider, may utilize at least one POS that can communicate with the acquirer 2508, the transaction handler 2506, or the issuer 2504. Thus, the POS is in operative communication with the payment processing system 2500.

Typically, a transaction begins with the consumer 2502 presenting an account number of an account (e.g., non-credit account) such as through the use of a computer terminal or a portable consumer device 2512 to the merchant 2510 to initiate an exchange for a good or service. The consumer 2502 may be an individual or a corporate entity. The consumer 2502 may be an account holder of the account issued by the issuer 2504, such as a joint account holder of the account or a person having access to the account, such as an employee of a corporate entity having access to a corporate account. The portable consumer device 2512 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 2512 may include a volatile or a non-volatile memory to store information such as the account number or a name of the account holder.

The merchant 2510 may use an acceptance point device, such as a POS, to obtain account information, such as the indicator for the account (e.g., the account number of the account), from the portable consumer device 2512. The portable consumer device 2512 may interface with the POS using a mechanism including any suitable electrical, magnetic, or optical interfacing system, such as a contactless system using radio frequency, a magnetic field recognition system, or a contact system such as a magnetic stripe reader. The POS sends a transaction authorization request to the issuer 2504 of the portable consumer device 2512. Alternatively, or in combination, the portable consumer device 2512 may communicate with the issuer 2504, the transaction handler 2506, or the acquirer 2508.

The issuer 2504 may submit an authorized response for the transaction via the transaction handler 2506. Authorization includes the issuer 2504, or the transaction handler 2506 on behalf of the issuer 2504, authorizing the transaction in connection with instructions of the issuer 2504, such as through the use of business rules. The transaction handler 2506 may maintain a log or history of authorized transactions. Once approved, the merchant 2510 can record the authorization and allow the consumer 2502 to receive the good or service.

The merchant 2510 may, at discrete periods, such as the end of the day, submit a list of authorized transactions to the acquirer 2508 or other components of the payment processing system 2500 for clearing and settling. The transaction handler 2506 may compare the submitted authorized transaction list with its own log of authorized transactions. If a match is found, the transaction handler 2506 may route the clearing and settling request from the corresponding acquirer 2508 to the corresponding issuer 2504 involved in each transaction. Once the acquirer 2508 receives the payment of the transaction from the issuer 2504, it can forward the payment to the merchant 2510 less any transaction costs, such as fees. If the transaction involves a debit or pre-paid card, the acquirer 2508 may choose not to wait for the initial payment prior to paying the merchant 2510.

There may be intermittent steps in the foregoing process, some of which may occur simultaneously. For example, the acquirer 2508 can initiate the clearing and settling process, which can result in payment to the acquirer 2508 for the amount of the transaction. The acquirer 2508 may request from the transaction handler 2506 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method comprising:
   sending, from a client, one or more transmissions including:
     a request for an installation of a desktop application, the desktop application implemented at least in part with computer-executable instructions; and
     information about an account issued by an issuer to an account holder;
   receiving data for the installation of the desktop application on the client, the data including the computer-executable instructions;
   installing the desktop application using the data for the installation such that the desktop application is linked to the account at least at the time of installation and the computer-executable instructions of the desktop application are executable by the client;
   receiving, at the client, an alert including data for a financial transaction on the account that was previously conducted with a merchant, wherein:
     the desktop of the client has rendered thereon a user interface, the user interface rendered at least in part by the desktop application installed on the client; and
     the account was issued by the issuer to the account holder to conduct a plurality of said financial transactions on the account with a plurality of said merchants, the issuer being distinct from the account holder and each merchant;
   if the alert has been received during a time period when a user of the client was not on line, storing the alert for future delivery to the desktop of the client; and
   responsive to receiving the alert including the data for the financial transaction, at least:
     initiating a real-time chat session with an executable agent incorporating artificial intelligence and representing the issuer; and
     providing, to the executable agent through the real-time chat session, a written request for an investigation by the issuer of the financial transaction with respect to authorization of the financial transaction by the account holder, the written request comprising at least a reference to the financial transaction associated with the alert.

2. The method as defined in claim 1, further comprising:
   conducting, using the user interface of the installed desktop application, the real-time chat to send information sufficient to initiate a bona fide dispute of the transaction for which the alert included data.

3. The method as defined in claim 2, wherein the one or more transmissions further comprises a request to receive, at the client for rendering on the desktop of the client, the alert including data for the transaction on the account conducted with the merchant.

4. The method as defined in claim 1, wherein:
   a portable consumer device corresponds to an account number corresponding to the account; and
   the portable consumer transaction device is selected from the group consisting of a non-credit account card, a prepaid card, a prepaid reloadable card, a debit account, a deposit account card, a flexible spending account card, a health savings account card, and combinations of the foregoing.

5. The method as defined in claim 1, wherein the data included in the alert is selected from the group consisting of:
   at least four digits from a full or one-time account number corresponding to the account;
   an identifier or type of merchant;
   an identifier of the types of commodities offered by the merchant;
   a date upon which the transaction was conducted;
   a time at which the transaction was conducted;
   a currency amount of the transaction;
   a sequence number of a portable consumer device corresponding to the account number corresponding to the account;
   a product type of the portable consumer device;

a transaction handler corresponding to the account;
an identifier of the issuer; and
a combination of the foregoing.

6. The method as defined in claim 1, wherein the user interface of the installed desktop application comprises a system tray icon, the selection of which activates a function of the installed desktop application, wherein the function is selected from the group consisting of:
a Rich Site Summary (RSS) feed to be received by the client for rendering upon the user interface;
audio data rendering by the client; and
the audio data rendering by the client with a textual rendering on the user interface descriptive of the audio data rendering.

7. The method as defined in claim 1, wherein:
the user interface of the installed desktop application comprises:
an expanded position thereof having one or more selectable functions of the installed desktop application;
a collapsed position thereof;
an expansion icon, rendered on the collapsed position, the selection of which activates a function of the installed desktop application to change rendering of the user interface on the desktop of the client from the collapsed position thereof to the expanded position thereof; and
a collapse icon, rendered on the expanded position, the selection of which activates a function of the installed desktop application to change the rendering of the user interface on the desktop of the client from the expanded position thereof to the collapsed position thereof.

8. The method as defined in claim 7, wherein the one or more selectable functions of the installed desktop application of the expanded position of the user interface are selected from the group consisting of:
a function of the installed desktop application to retrieve a location of an automatic teller machine derived from a geographic location of a personal computer upon which the client is executing;
a function of the installed desktop application to retrieve select categories of goods and services for which an offer will be made to conduct a future said transaction upon the account, and wherein a graphic descriptive of the offer will be received by the client for rendering on the user interface;
a function of the installed desktop application to perform maintenance of the software executing on the client; and
a function of the installed desktop application to send a request to convert a currency of a loyalty program credited to the account into an award to be received by the account holder.

9. The method as defined in claim 1, wherein the user interface of the installed desktop application comprises:
an area for rendering a graphic descriptive of an offer to the account holder to conduct a future said transaction upon the account; and
a selectable function of the installed desktop application to send a request to accept the offer.

10. The method as defined in claim 1, wherein:
the transaction on the account that is conducted with the merchant is for a payment amount;
the merchant submits the payment amount to an acquirer for processing by a transaction handler who requests the issuer to obtain the payment amount from the account; and
the issuer forwards the payment amount to the transaction handler who forwards the payment amount to the acquirer to pay the payment amount the merchant.

11. The method as defined in claim 1, wherein the real-time chat session with the executable agent incorporating artificial intelligence is interactive.

12. The method as defined in claim 11, wherein the executable agent incorporating artificial intelligence helps a user respond to the alert during the interactive chat session.

13. The method as defined in claim 12, wherein the executable agent incorporating artificial intelligence helps the user respond to the alert during the interactive chat session at least in part by helping the user provide the written request for the investigation of the transaction including information sufficient to initiate a bona fide dispute.

14. The method as defined in claim 12, wherein the executable agent incorporating artificial intelligence helps the user respond to the alert during the interactive chat session at least in part by helping the user provide the written request in accordance with a Fair Credit Billing Act codified no later than May 16, 2008.

15. The method as defined in claim 12, wherein the executable agent incorporating artificial intelligence helps the user respond to the alert during the interactive chat session at least in part by helping the user provide the written request in accordance with an Electronic Fund Transfer Act codified no later than May 16, 2008.

16. A method comprising:
sending one of more transmissions from a client including:
a request for data for an installation of a desktop application, the desktop application implemented at least in part with computer-executable instructions; and
information about an account issued by an issuer to an account holder;
receiving the data for the installation of the desktop application, the data including the computer-executable instructions;
installing the desktop application using the data for the installation such that the desktop application is linked to the account at the time of installation and the computer-executable instructions of the desktop application are executable by the client;
receiving, for rendering on the desktop at least in part by the desktop application, an alert including data for a financial transaction that was previously conducted on the account with a merchant, wherein the account was issued by the issuer to the account holder to conduct a plurality of said financial transactions on the account with a plurality of said merchants, the issuer being distinct from the account holder and each merchant, and wherein the data included in the alert is selected from the group consisting of:
at least four digits from an account number corresponding to the account;
an identifier of the merchant;
a date and time of the transaction;
an currency amount of the transaction;
a transaction handler corresponding to the account;
an identifier of the issuer; and
a combination of the foregoing;
if the alert has been received during a time period when a user of the client was not on line, storing the alert for future delivery to the desktop of the client; and
responsive to receiving the alert including the data for the financial transaction, at least:

initiating a real-time chat session with an executable agent incorporating artificial intelligence and representing the issuer; and providing, to the executable agent through the real-time chat session, a written request for an investigation by the issuer of the financial transaction with respect to authorization of the financial transaction by the account holder, the written request comprising at least a reference to the financial transaction associated with the alert.

17. The method as defined in claim 16, wherein the user interface of the installed desktop application comprises an icon the selection of which activates a function of the installed desktop application, wherein the function is selected from the group consisting of:
   a Rich Site Summary (RSS) feed to be received by the client for rendering upon the user interface;
   audio data rendering by the client; and
   the audio data rendering by the client with a textual rendering on the user interface descriptive of the audio data rendering.

18. The method as defined in claim 16, wherein the user interface of the installed desktop application comprises:
   an area for rendering a graphic descriptive of an offer to the account holder to conduct a future said transaction upon the account; and
   a selectable function of the installed desktop application to send a request to accept the offer.

19. The method as defined in claim 16, wherein:
   the transaction on the account that is conducted with the merchant is for a payment amount;
   the merchant submits the payment amount to an acquirer for processing by a transaction handler who requests the issuer to obtain the payment amount from the account; and
   the issuer forwards the payment amount to the transaction handler who forwards the payment amount to the acquirer to pay the payment amount the merchant.

20. A computer program product for use on a client computer system for conducting, in real time, a bona fide dispute of a transaction on an account conducted with a merchant, the computer program product comprising a tangible computer-usable medium having a computer readable program code thereon, the computer-readable program code including program code for, at least:
   requesting an installation of a desktop application, the desktop application implemented at least in part with computer-executable instructions;
   receiving data for installation of the desktop application including information about an account issued by an issuer to an account holder to conduct a plurality of financial transactions on the account with a plurality of merchants and the computer-executable instructions, the issuer being distinct from the account holder and each merchant;
   installing the desktop application using the data for the installation such that the desktop application is linked to the account at the time of installation and the computer-executable instructions of the desktop application are executable by the client;
   storing, on a computer-readable medium, alert data including data descriptive of a financial transaction on the account that was previously conducted with a merchant;
   upon activation of a desktop of the client computer system, rendering an alert icon on the desktop, the alert icon being rendered at least in part by the desktop application installed on the client computer system, the alert icon being descriptive of the alert data; and
   responsive to user interaction associated with the alert icon, at least:
      initiating a real-time chat session with an executable agent incorporating artificial intelligence and representing the issuer; and
      providing, to the executable agent through the real-time chat session, a written request for an investigation by the issuer of the financial transaction with respect to authorization of the financial transaction by the account holder, the written request comprising at least a reference to the financial transaction associated with the alert.

21. The computer program product as defined in claim 20, wherein the one or more transmissions further comprises a request to receive, at the client for rendering on the desktop of the client, the alert including data for the transaction on the account conducted with the merchant.

22. The computer-program product as defined in claim 20, wherein the stored alert data is selected from the group consisting of:
   at least four digits from a full or one-time account number corresponding to the account;
   an identifier or type of merchant;
   an identifier of the types of commodities offered by the merchant;
   a date upon which the transaction was conducted;
   a time at which the transaction was conducted;
   a currency amount of the transaction;
   a sequence number of a portable consumer device corresponding to the account number corresponding to the account;
   a product type of the portable consumer device;
   a transaction handler corresponding to the account;
   an identifier of the issuer; and
   a combination of the foregoing.

23. The computer program product as defined in claim 20, wherein the computer-readable program code further includes program code for rendering an icon, the selection of which activates a function of the installed desktop application, wherein the function is selected from the group consisting of:
   a Rich Site Summary (RSS) feed to be received by the client for rendering upon a display area of the user interface;
   audio data rendering by the client; and
   the audio data rendering by the client with a textual rendering descriptive of the audio data for rendering on a display area of the user interface.

24. The computer program product user interface as defined in claim 20, wherein the computer-readable program code further includes program code for:
   activating, on the desktop, an area for rendering a graphic descriptive of an offer to the account holder to conduct a future said transaction upon the account; and
   executing a selectable function of the installed desktop application to send a request to accept the offer.

25. The computer program product as defined in claim 20, wherein:
   the transaction on the account that is conducted with the merchant is for a payment amount;
   the merchant submits the payment amount to an acquirer for processing by a transaction handler who requests the issuer to obtain the payment amount from the account; and
   the issuer forwards the payment amount to the transaction handler who forwards the payment amount to the acquirer to pay the payment amount the merchant.

* * * * *